United States Patent
Kato

(10) Patent No.: US 7,924,340 B2
(45) Date of Patent: Apr. 12, 2011

(54) IMAGE-TAKING APPARATUS AND IMAGE DISPLAY CONTROL METHOD

(75) Inventor: Yasunori Kato, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 690 days.

(21) Appl. No.: 11/878,507

(22) Filed: Jul. 25, 2007

(65) Prior Publication Data

US 2008/0024643 A1    Jan. 31, 2008

(30) Foreign Application Priority Data

Jul. 25, 2006    (JP) .................................. 2006-202594

(51) Int. Cl.
*H04N 5/222*    (2006.01)

(52) U.S. Cl. ......... 348/333.05; 348/333.01; 348/333.02; 348/333.03; 348/333.04; 348/333.11; 348/333.12

(58) Field of Classification Search . 348/333.01–333.12
See application file for complete search history.

(56) References Cited

U.S. PATENT DOCUMENTS

| | | | |
|---|---|---|---|
| 2003/0071908 A1* | 4/2003 | Sannoh et al. | 348/345 |
| 2005/0219393 A1* | 10/2005 | Sugimoto | 348/333.01 |
| 2005/0251015 A1 | 11/2005 | Takikawa et al. | |
| 2006/0238627 A1* | 10/2006 | Hagiwara et al. | 348/231.99 |

FOREIGN PATENT DOCUMENTS

| | | |
|---|---|---|
| CN | 1604621 A | 4/2005 |
| JP | 2005-102175 A | 4/2005 |
| JP | 2005-311888 A | 11/2005 |
| JP | 2005-318515 A | 11/2005 |
| KR | 1020060086808 | 8/2006 |

OTHER PUBLICATIONS

CN Notification of First Office Action, dated Jan. 16, 2009, issued in corresponding CN Application No. 200710136740.8, 12 pages English and Chinese.
Notice of Reasons for Rejection, dated Oct. 25, 2010, issued in corresponding JP Application No. 2006-202594, 6 pages in English and Japanese.

* cited by examiner

*Primary Examiner* — Jason Chan
*Assistant Examiner* — Yih-Sien Kao
(74) *Attorney, Agent, or Firm* — Sughrue Mion, PLLC

(57) ABSTRACT

According to the present invention, by providing operation members dedicated for an operation of switching on/of the face detection processing, a face image switching operation, and proceeding to the next image taking, operations related to the face detection processing can be simplified. Furthermore, by displaying a taken image and an face image at the same time, the operation of proceeding to the next image taking after confirming the condition of focus and exposure and the face expression of a subject person can be performed easily.

36 Claims, 16 Drawing Sheets

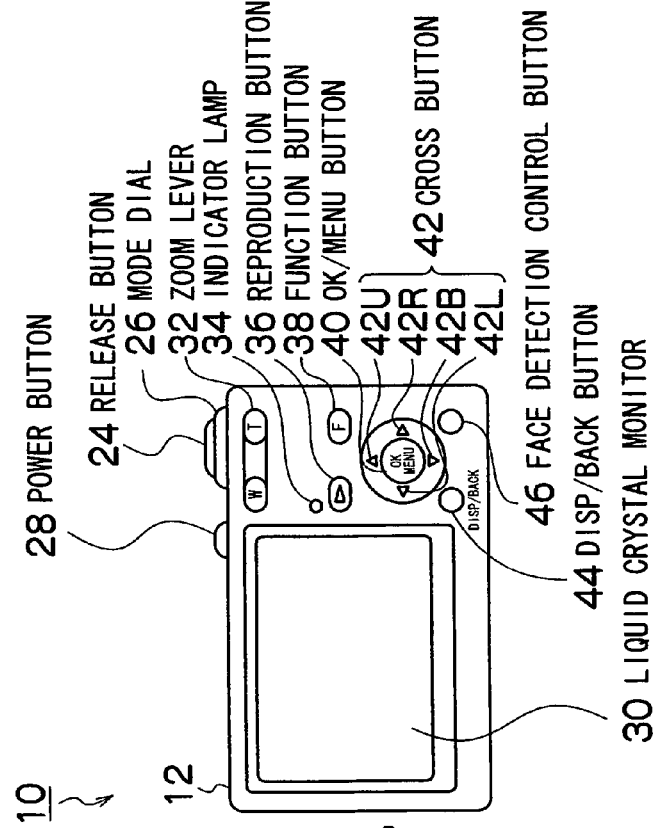
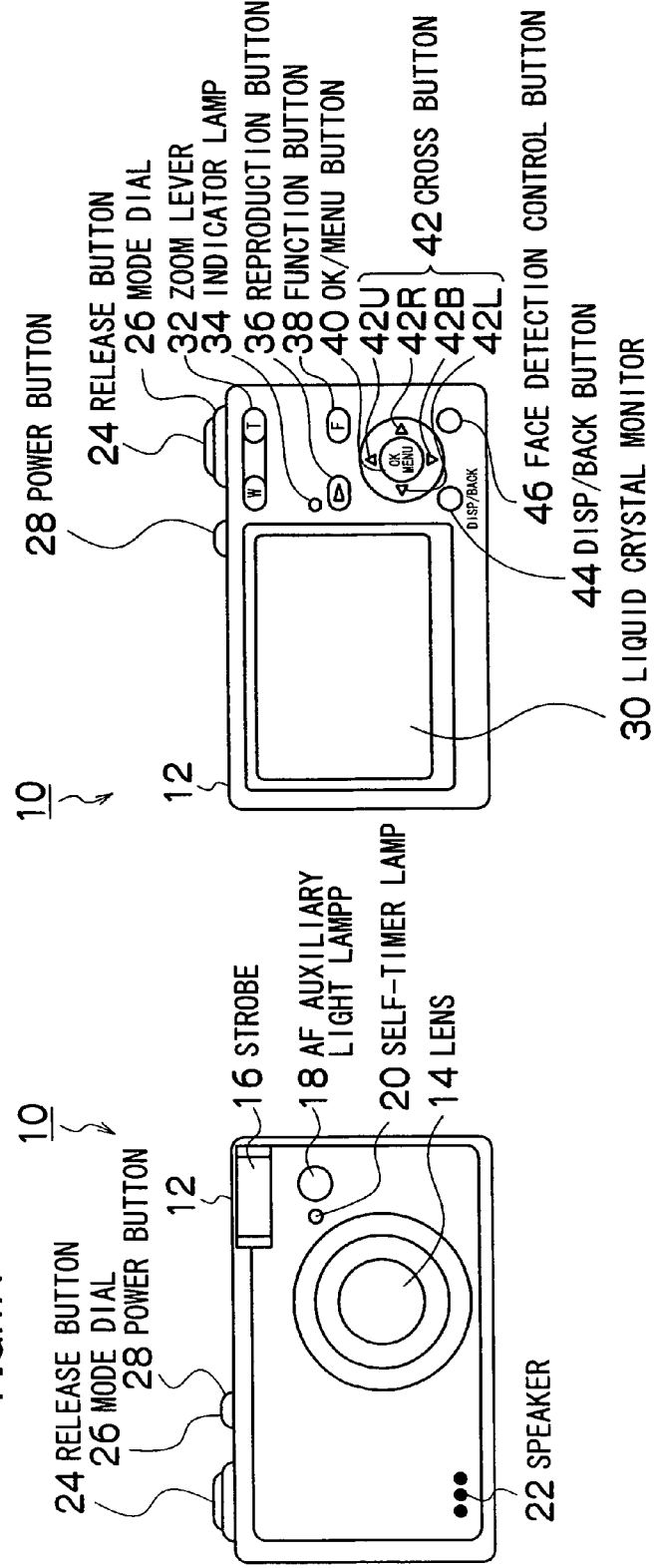

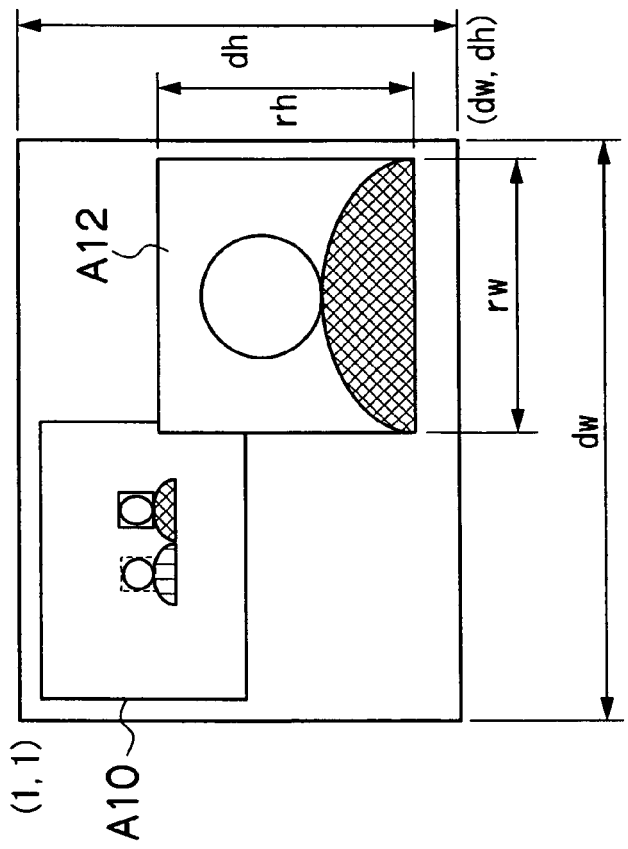
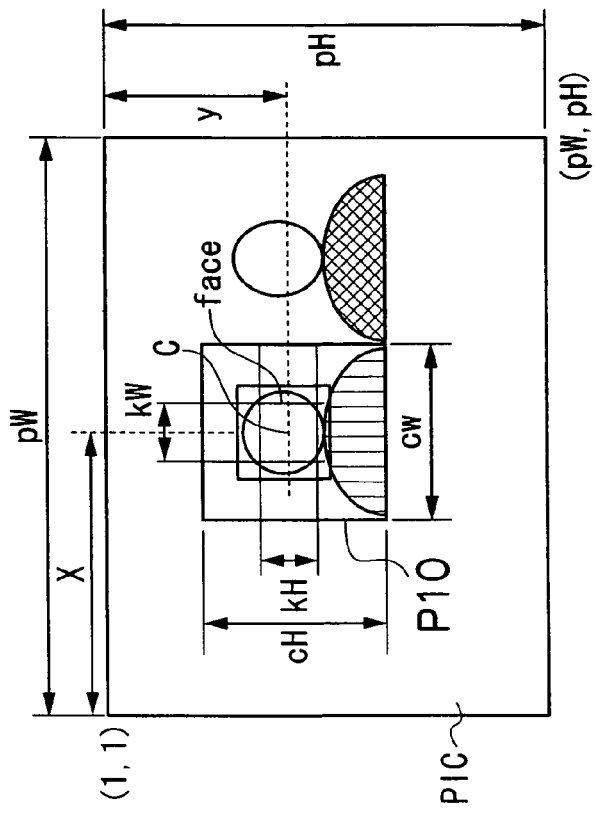
FIG.8B
FIG.8A

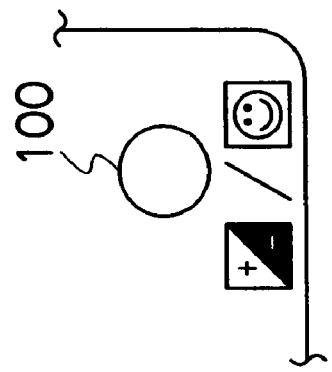
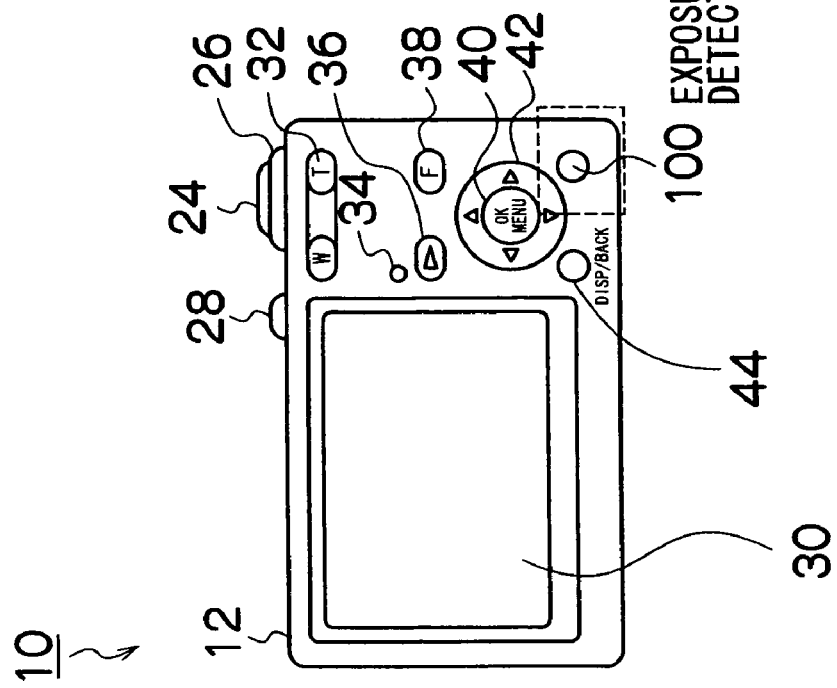
FIG.13A
FIG.13B

IMAGE-TAKING APPARATUS AND IMAGE DISPLAY CONTROL METHOD

BACKGROUND OF THE INVENTION

1. Field of the Invention

The present invention relates to an image-taking apparatus and an image display control method, and more particularly to a technique for detecting the face of a subject person.

2. Description of the Related Art

There have been proposed techniques for detecting the face of a subject person from a taken image and displaying it in an enlarged state. For example, Japanese Patent Application Laid-Open No. 2005-311888 discloses an enlarged-display apparatus which detects a subject to be noticed, such as a person's face, from an image displayed on a screen, determines, based on the position, size and the like of the detected subject to be noticed, a display screen or an enlargement ratio for displaying the subject to be noticed in an enlarged state, and shows enlarged display in accordance with the determined display screen and enlargement ratio. Japanese Patent Application Laid-Open No. 2005-318515 discloses a digital still camera capable of, if a face image is included in an image, enlarging the face image part.

SUMMARY OF THE INVENTION

Conventional techniques are not suitable for confirming how a face image is taken when continuously taking images because the operation of detecting a face from a taken image, displaying it in an enlarged state for confirmation, and then proceeding to image taking again is complicated. In the case of a terminal which is not provided with a pointing device like a mouse, such as an electronic camera and a mobile phone, the operation of, when multiple faces detected from an image, selecting a particular face from among the detected multiple faces is complicated. For example, in the case of selecting a face with a cross button, there is a problem that it is difficult to determine which button on the cross button should be pressed to move a cursor to the desired face if the faces in the image are irregularly arranged.

The present invention has been made in consideration of the above situation, and its object is to provide an image-taking apparatus and an image display control method in which the operation of detecting a face from a taken image for confirmation is easy.

To solve the above problems, an image-taking apparatus according to a first aspect of the present invention comprises: an image-taking device which takes an image of a subject; a display device which displays the image taken by the image-taking device; a face detection device which detects a face of a person who is the subject, from the taken image; an operation member for face detection control which gives an instruction to set on/off of face detection processing performed by the face detection device; and a display control device which controls the face detection device to execute the face detection processing for an image taken when the face detection processing is set to on, and causes the display device to display a face image including a face area detected from the taken image.

According to the first aspect of the present invention, by providing an operation member dedicated for switching on/of the face detection processing, operations related to the face detection processing can be simplified.

The image-taking apparatus according to a second aspect of the present invention comprises: an image-taking device which takes an image of a subject; a display device which displays the image taken by the image-taking device; a face detection device which detects a face of a person who is the subject, from the taken image; an image-taking mode setting device which sets an image-taking mode for taking an image by the image-taking device; an operation member for face detection control which gives an instruction to set on/off of face detection processing performed by the face detection device; and a display control device which controls the face detection device to execute the face detection processing for an image taken when such an image-taking mode that enables the face detection processing is set and the face detection processing is set to on, and causes the display device to display a face image including a face area detected from the taken image.

According to the second aspect of the present invention, by providing an operation member dedicated for switching on/of the face detection processing, operations related to the face detection processing can be simplified. Furthermore, by performing the face detection processing only under such an image-taking mode that enables the face detection processing without performing the face detection processing under such an image-taking mode that does not enable the face detection processing, the operation of the face detection processing can be simplified.

A third aspect of the present invention is the image-taking apparatus according to the first or second aspect of the present invention, wherein the display control device causes the display device to display the face image when preview display of the taken image is shown after the image-taking; and the image-taking apparatus further comprises a display switching device which ends the preview display in response to an instruction from the operation member for face detection control.

According to the third aspect of the present invention, by using the operation member for face detection control as an operation member for ending display of a face image, the operation can be further simplified.

A fourth aspect of the present invention is the image-taking apparatus according to any of the first to third aspects of the present invention, further comprising a face image switching device which, if multiple face areas are detected from the taken image, switches the face image to a different face image in response to an instruction from the operation member for face detection control.

According to the fourth aspect of the present invention, since the face image switching operation can be also performed by the operation member for face detection control, the face detection operation can be further simplified.

A fifth aspect of the present invention is the image-taking apparatus according to any of the first to fourth aspects of the present invention, wherein the display control device displays the face image and the taken image on the display device at the same time.

According to the fifth aspect of the present invention, by displaying a taken image and an face image at the same time, the operation of proceeding to the next image taking after confirming the condition of focus and exposure and the face expression of a subject person can be simplified.

A sixth aspect of the present invention is the image-taking apparatus according to any of the first to fifth aspects of the present invention, wherein the operation member for face detection control is also used as a different operation member which is not used while the face image is displayed.

According to the sixth aspect of the present invention, by using the operation member for face detection control also as a different operation member, it is possible to reduce the number of the operation members constituting the image-taking apparatus and simplify the configuration of the operation members, and thereby the operation of face detection can be further facilitated.

A seventh aspect of the present invention is the image-taking apparatus according to any of the first to sixth aspects of the present invention, wherein the face detection device adjusts the height and width of the face image so that the number of vertical pixels and the number of horizontal pixels of the face image are equal to or above the number of vertical pixels and the number of horizontal pixels of an area of the display device for displaying a face image, respectively.

According to the seventh aspect of the present invention, by causing the number of vertical pixels and the number of horizontal pixels of a face image to be equal to or above the number of vertical pixels and the number of horizontal pixels of the area for displaying a face, respectively, the resolution of the display device can be utilized to the maximum. For example, in the case where a face area is small relative to the display device, the enlarged display may be unclear and confirmation of focus and the like may be difficult if the face area is displayed in an enlarged state by performing interpolation of pixels or the like. However, this can be avoided. Thus, confirmation of a detected image can be performed more easily.

An eighth aspect of the present invention is the image-taking apparatus according to any of the first to seventh aspects of the present invention, wherein the display control device cuts out a predetermined-sized area including the face area of the subject which has been detected by the face detection device from the taken image to display the cut-out area on the display device, and, if the cut-out area including the face area overlaps with an edge of the taken image, reduces the cut-out area including the face area so that it does not overlap with the edge.

According to the eighth aspect of the present invention, since the processing for adjusting the size of a face image to be cut out in accordance with the size of a taken image can be automated, confirmation of a detected image can be performed more easily.

An image display control method according to a ninth aspect of the present invention comprises: an image-taking step of taking an image of a subject; a step of setting on/off of face detection processing, by an operation member for face detection control which gives an instruction to set on/off of the face detection processing; and a display control step of executing, for an image taken when the face detection processing is set to on, the face detection processing for detecting a face area of the subject, and displaying a face image including the face area detected from the taken image on a display device.

An image display control method according to a tenth aspect of the present invention comprises: an image-taking step of taking an image of a subject; an image-taking mode setting step of setting an image-taking mode for taking the image; a step of setting on/off of face detection processing by an operation member for face detection control which gives an instruction to set on/off of the face detection processing; and a display control step of executing, for an image taken when such an image-taking mode that enables the face detection processing is set and the face detection processing is set to on, the face detection processing for detecting a face area of the subject, and displaying a face image including the face area detected from the taken image on a display device.

An eleventh aspect of the present invention is the image display control method according to the ninth or tenth aspect of the present invention, wherein at the display control step, the face image is displayed when preview display of the taken image is shown after the image taking; and the method further comprises a display switching step of ending the preview display in response to an instruction from the operation member for face detection control.

A twelfth aspect of the present invention is the image display control method according to any of the ninth to eleventh aspects of the present invention, further comprising a face image switching step of, if multiple face areas are detected from the taken image, switching the face image to a different face image in response to an instruction from the operation member for face detection control.

A thirteenth aspect of the present invention is the image display control method according to any of the ninth to twelfth aspects of the present invention, wherein, at the display control step, the face image and the taken image are displayed on a display device at the same time.

A fourteenth aspect of the present invention is the image display control method according to any of the ninth to thirteenth aspects of the present invention, wherein the display control step includes a step of adjusting the height and width of the face image so that the number of vertical pixels and the number of horizontal pixels of the face image are equal to or above the number of vertical pixels and the number of horizontal pixels of an area of the display device for displaying a face image, respectively.

A fifteenth aspect of the present invention is the image display control method according to any of the ninth to fourteenth aspects of the present invention, wherein the display control step includes the steps of: cutting out a predetermined-sized area including the face area of the subject which has been detected by the face detection processing from the taken image to display the cut-out area on the display device; and if the cut-out area including the face area overlaps with an edge of the taken image, reducing the cut-out area including the face area so that it does not overlap with the edge.

According to the present invention, by providing operation members dedicated for an operation of switching on/of the face detection processing, a face image switching operation, and proceeding to the next image taking, operations related to the face detection processing can be simplified. Furthermore, by displaying a taken image and an face image at the same time, the operation of proceeding to the next image taking after confirming the condition of focus and exposure and the face expression of a subject person can be performed easily.

BRIEF DESCRIPTION OF THE DRAWINGS

FIGS. 1A and 1B show the external view of an image-taking apparatus according to a first embodiment of the present invention;

FIGS. 8A and 8B illustrate a method for cutting out a face area from a taken image PIC;

FIGS. 9A to 9C-2 illustrate the method for cutting out a face area from a taken image PIC;

FIGS. 13A and 13B show the external view of the back of an image-taking apparatus according to a second embodiment of the present invention;

DETAILED DESCRIPTION OF THE PREFERRED EMBODIMENTS

First Embodiment

Figure 2:
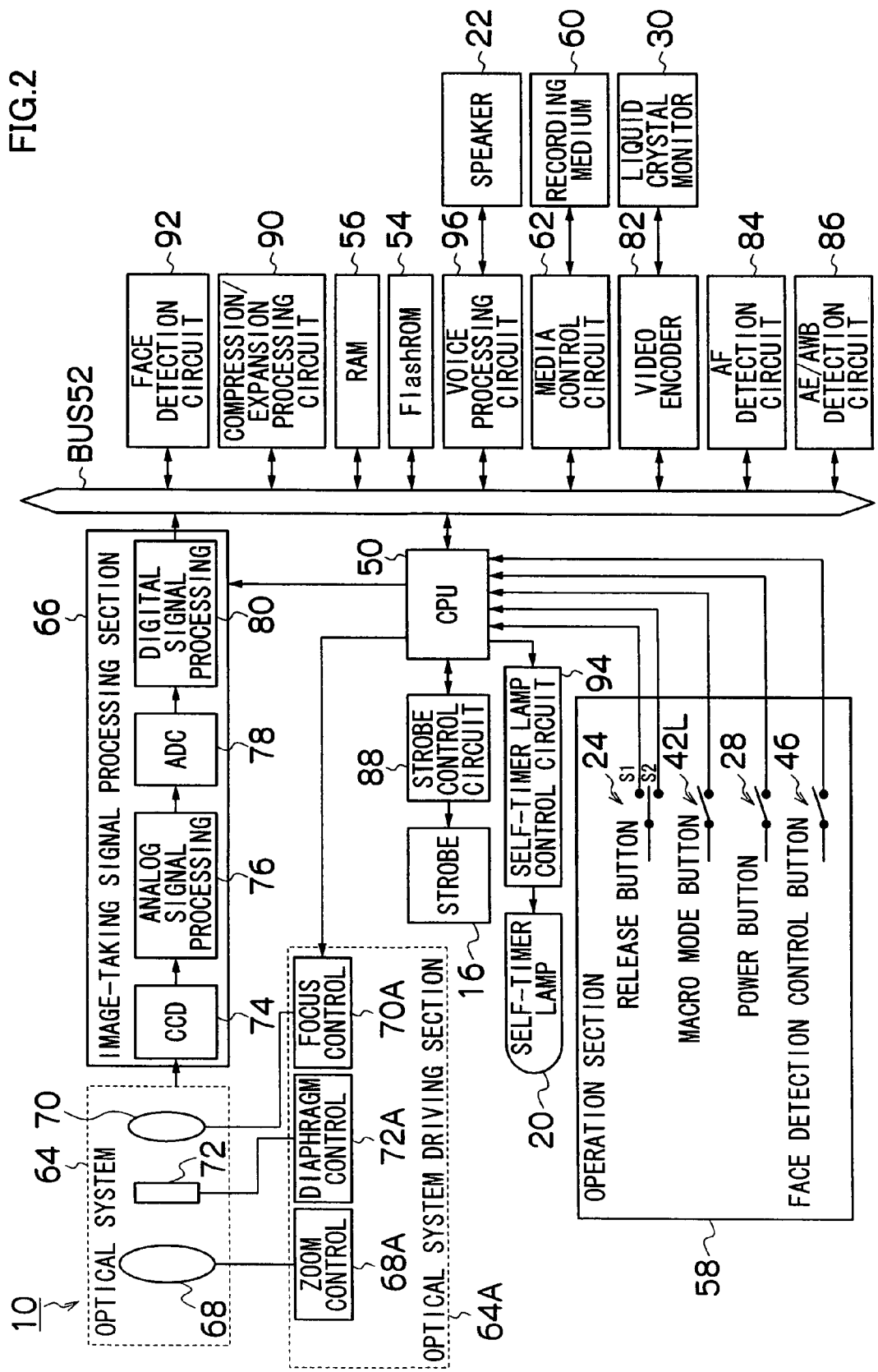
FIG. 2 is a block diagram showing the internal configuration of the image-taking apparatus according to the first embodiment of the present invention.

Preferred embodiments of an image-taking apparatus and an image display control method according to the present invention will be described below, with reference to accompanying drawings. FIG. 1A shows the external view of the front of an image-taking apparatus according to a first embodiment of the present invention, and FIG. 1B shows the external view of the back thereof. The image-taking apparatus 10 is an electronic camera provided with still-image/movie recording and reproduction functions. A camera body 12 of the image-taking apparatus 10 is formed in a flat and rectangle box shape. As shown in FIG. 1A, there are provided an image-taking lens 14, a strobe 16, an AF auxiliary light lamp 18, a self-timer lamp 20 and a speaker 22 on the front of the camera body 12, and there are provided a release button 24, a mode dial 26 and a power button 28 on the upper surface. As shown in FIG. 1B, there are provided a liquid crystal monitor 30, a zoom lever 32, an indicator lamp 34, a reproduction button 36, a function button 38, an OK/MENU button 40, a cross button 42, a DISP/BACK button 44 and a face detection control button 46 on the back of the camera body 12.

The power button 28 functions as a button for turning on/off the power source of the image-taking apparatus 10.

The image-taking lens 14 consists of a retractable zoom lens, and it is pulled out of the front of the camera body 12 by turning on the power of the image-taking apparatus 10. It is retracted into the camera body 12 by turning off the power of the image-taking apparatus 10.

The release button 24 consists of a two-stage stroke type button which enables so-called "half press" and "full press". The "half press" causes AF (auto focus) and AE (auto exposure) to function, and the "full press" causes image taking to be executed.

The liquid crystal monitor 30 provided on the back of the camera body 12 is used as a monitor for reproducing a taken image as well as being used as an electronic view finder during image taking. The DISP/BACK button 44 functions as a button for switching on/off of this electronic view finder. The liquid crystal monitor 30 is also used as a display screen as a user interface, and information such as menu information, selection items and contents of settings is displayed as necessary. It is also possible to use a display of a different type, such as an organic EL (electro-luminescence), instead of the liquid crystal monitor 30.

The image-taking apparatus 10 has two operation modes: an image-taking mode for taking an image and a reproduction mode for reproducing the image. The reproduction button 36 functions as a button for switching from the image-taking mode to the reproduction mode. By pressing the reproduction button 36 during the image-taking mode, the operation mode is switched from the image-taking mode to the reproduction mode. Switching from the reproduction mode to the image-taking mode is performed by half-pressing the release button 24 during the reproduction mode.

The indicator lamp 34 functions as a lamp for indicating the operation state of the camera (for example, the state of AF being locked, the state of an image being recorded and the state of electricity being charged).

The mode dial 26 functions as a switch for switching among the image-taking modes of the image-taking apparatus 10. According to the position where the mode dial 26 is set, the mode is switched to a scene position mode for performing image taking by optimizing focus and exposure depending on the scene position (whether the image taking is intended to take, for example, a natural photograph, a person, scenery, sports, a night view, an underwater photograph, a close-up photograph (of a flower and the like) or a text sentence), an automatic image-taking mode for automatically setting focus and exposure, a manual image-taking mode enabling manual setting of focus and exposure or a movie shooting mode.

The zoom lever 32 consists of a seesaw button which is supported in the middle so that it can be pressed down at the right or the left, and it functions as an operation button for performing a zoom operation. That is, by pressing down this zoom lever 32 at the right under the image-taking mode, a tele-direction zoom operation is performed; and by pressing it down at the left, a wide-direction zoom operation is performed. Furthermore, by pressing the zoom lever 32 at the right under the reproduction mode, a reproduced image is displayed in an enlarged state; and by pressing it at the left, a reproduced image is displayed in a reduced state.

The OK/MENU button 40 functions as a button for instructing display of a menu screen. By pressing this OK/MENU button 40, the menu screen is displayed on the liquid crystal monitor 30. The OK/MENU button 40 also functions as a button for instructing decision of an item selected from the menu screen or execution of an operation. The DISP/BACK button 44 functions as a button for instructing cancellation of selection of an item from the menu screen or return to the previous state.

As shown in FIG. 1B, the cross button 42 is a seesaw button which is supported in the middle so that it can be pressed down at the top, the bottom, the right or the left, and it is formed to surround the OK/MENU button 40. The cross button 42 is constituted by an upper button 42U, a lower button 42B, a left button 42L and a right button 42R and functions as a cursor shift key for selecting a reproduced through movie image during the reproduction mode or moving a cursor which indicates selection of an item on the menu screen. That is, under the reproduction mode, the left button 42L functions as a frame return button (a button for instructing the image of the immediately previous frame to be displayed), and the right button 42R functions as a frame advance button (a button for instructing the image of the immediately following frame to be displayed).

The left button 42L functions as a macro mode button for switching on/off of a macro function (close-up image-taking function) under the still-image taking mode or a movie shooting mode. By pressing the left button 42L, the macro function is turned on or off.

The right button 42R functions as a button for switching the flash mode under the still-image taking mode or the movie shooting mode. By pressing the right button 42R, the flash mode is set to a flash on mode or flash off mode.

The upper button 42U functions as a single frame deletion button for deleting the image of one frame under the reproduction mode.

The lower button 42B functions as a button for setting conditions for self-timer image taking. Each time the lower button 42B is pressed under the image-taking mode, the self timer is switched between on and off.

The function button 38 functions as a button for setting the number of recorded pixels, image-taking sensitivity and color tone under the image-taking mode and functions as a button for setting print reservation under the reproduction mode.

The face detection control button 46 functions as a button for setting on/off of face detection under the image-taking mode and functions as a button for selecting a face in an image during preview display of a taken image and under the reproduction mode. Furthermore, the face detection control button 46 functions as a button for ending preview of a taken image or a face image detected from the taken image. Under the image-taking mode, an icon or the like which indicates on/off of face detection may be displayed on the liquid crystal monitor 30.

[Internal Configuration of the Image-Taking Apparatus 10]

FIG. 2 is a block diagram showing the internal configuration of the image-taking apparatus 10. As shown in FIG. 2, the image-taking apparatus 10 is provided with a central processing unit (CPU) 50. The CPU 50 performs overall control of the operation of the entire image-taking apparatus 10. The CPU 50 functions as a control device which controls this camera system in accordance with a predetermined program and functions as a computation device which performs various computations such as auto exposure (AE) computation, auto focus (AF) adjustment computation and white balance (WB) adjustment computation.

A flash ROM (flash read-only memory) 54 is connected to the CPU 50 via a bus 52. In the flash ROM 54, there are stored programs to be executed by the CPU 50, various data required for control and the like as well as CCD pixel defect information and various constants/information related to the operations of the camera.

A RAM (random-access memory) 56 is used as an area for development of a program and an area for computation work by the CPU 50, and it is also used as a temporary storage area for image data and voice data. The RAM 56 is also used as a VRAM (video random-access memory), which is a temporary storage memory dedicated for image data, and it includes an A area and a B area.

An operation section 58 includes various operation switches such as the release button 24, the mode dial 26, the power button 28, the zoom lever 32, the indicator lamp 34, the reproduction button 36, the function button 38, the OK/MENU button 40, the cross button 42, the DISP/BACK button 44 and the face detection control button 46 described above. In FIG. 2, the operation switches other than the release button 24, the macro mode button 42L, the power button 28 and the face detection control button 46 are omitted in FIG. 2. Signals from these various operation switches are inputted to the CPU 50. The CPU 50 controls each circuit of the image-taking apparatus 10 based on the input signals and performs, for example, lens driving control, image-taking operation control, image processing control, image data recording/reproduction control, display control of the liquid crystal monitor 30 and the like.

The image-taking apparatus 10 has a media socket (a medium attaching section) not shown, and a recording medium 60 can be attached to the media socket. The type of the recording medium 60 is not especially limited, and various media can be used, such as a semiconductor memory card represented by xD Picture Card (registered trade mark) and Smart Media®, a portable small-sized hard disk, a magnetic disk, an optical disk and a magneto-optical disk. A media control circuit 62 performs required signal conversion to transfer an input/output signal suitable for the recording medium 60.

The image-taking apparatus 10 is provided with an external connection interface section as a communication device which connects to an external device such as a personal computer. By connecting the image-taking apparatus 10 to the external device with a USB cable or the like not shown, the image-taking apparatus 10 can exchange data with the external device. Of course, the communication method is not limited to the USB method. Other communication methods such as IEEE1394 and Bluetooth® may be applied.

[Image-Taking Mode]

Next, the image-taking function of the image-taking apparatus 10 will be described. Under the image-taking mode, power is supplied to an image-taking signal processing section 66 which includes an optical system 64, an optical system driving section 64A and a color CCD image sensor (hereinafter referred to as a CCD 74), and thereby image taking is enabled.

The optical system 64 is an optical unit which includes an image-taking lens including a zoom lens 68 and a focus lens 70, and a mechanical shutter 72 which is also used as a diaphragm. Zooming of the image-taking lens is performed by a zoom control section 68A causing the zoom lens 68 to move, and focusing is performed by a focus control section 70A causing the focus lens 70 to move. The CPU 50 outputs a control signal to the zoom control section 68A and the focus control section 70A to perform control.

The diaphragm 72 consists of a so-called turret diaphragm, and the diaphragm value (F value) is changed by rotating a turret plate in which diaphragm holes ranging from F2.8 to F8 are made. The diaphragm 72 is driven by a diaphragm control section 72A. The CPU 50 outputs a control signal to this diaphragm control section 72A to perform control.

The optical system driving section 64A has a device which drives the optical system 64 or the CCD 74 to perform camera shake compensation.

From light passing through the optical system 64, an image is formed on the light receiving surface of the CCD 74 of the image-taking signal processing section 66. On the light receiving surface of the CCD 74, a lot of photodiodes (light receiving elements) are two-dimensionally arrayed. For each photodiode, primary color filters in red (R), green (G) and blue (B) are arranged in a predetermined array structure. The CCD 74 has an electronic shutter function of controlling the charge accumulation time (shutter speed) of each photodiode. The CPU 50 controls the charge accumulation time for the CCD 74 via a timing generator (TG) not shown. Furthermore, the CPU 50 controls the OFD (overflow drain) potential of the CCD 74 to adjust the upper limit of signal charge accumulated in the photodiodes constituting the CCD 74.

The subject image formed on the light receiving surface of the CCD 74 is converted to an amount of signal charge corresponding to the amount of the incident light by each photodiode. The signal charge accumulated in each photodiode is sequentially read as a voltage signal (an image signal) corresponding to the signal charge, based on a driving pulse given by TG (such as a reading pulse, a vertical transfer clock and a horizontal transfer clock) in accordance with an instruction by the CPU 50.

The signal outputted from the CCD 74 is sent to an analog signal processing section (CDS/AMP) 76. For the R, G and B signals for each pixel, sampling/hold processing (correlation double sampling processing) is performed by the analog signal processing section 76 in order to amplify them, and then they are added to an A/D converter (ADC) 78. The point sequential R, G and B signals which have been converted to digital signals by the A/D converter 78 are added to a digital signal processing section 80.

The digital signal processing section 80 functions as an image processing device which includes a synchronization circuit (a processing circuit for interpolating the spatial gap among the color signals caused due to the array of the color filters of a single-plate CCD to convert the color signals to synchronous signals), a white balance adjustment circuit, a gamma correction circuit, an outline correction circuit, a brightness/color difference signal generation circuit and the like. It performs predetermined signal processing by utilizing the RAM 56 in accordance with commands from the CPU 50. That is, the RGB image data inputted to the digital signal processing section 80 are converted to brightness signals (Y signals) and color difference signals (Cr and Cb signals), and predetermined processings such as gamma correction is performed for the signals. The image data processed by the digital signal processing section 80 is stored in the RAM 56.

In the case of outputting a taken image to the liquid crystal monitor 30, the image data is read from the RAM 56 and sent to a video encoder 82 via the bus 52. The video encoder 82 converts the inputted image data to a video signal in a predetermined method for display (for example, a color compound image signal in the NTSC method) and outputs it to the liquid crystal monitor 30.

Image data corresponding to an image of one frame is overwritten alternately on the A and B areas of the RAM 56, by an image signal outputted from the CCD 74. From the area A or B of the RAM 56, on which image data is not being overwritten, the image data written there is read. By periodically overwriting the image data in the RAM 56 in this way and supplying an image signal generated from the image data to the liquid crystal monitor 30, a movie being shot is displayed on the liquid crystal monitor 30 in real time. A photographer can confirm the image-taking angle of view from the movie (through movie image) displayed on the liquid crystal monitor 30.

When the image-taking switch is half-pressed and S1 is on, the image-taking apparatus 10 starts AE and AF processings. That is, an image signal outputted from the CCD 74 is A/D converted, and then they are inputted to an AF detection circuit 84 and an AE/AWB detection circuit 86 via the bus 52.

The AE/AWB detection circuit 86 includes a circuit which divides one screen into multiple divided areas (for example, 8×8 or 16×16 areas) and integrates RGB signals for each of the divided areas, and the integrated value is provided to the CPU 50. The CPU 50 detects the brightness of a subject (subject brightness) on the basis of the integrated value obtained from the AE/AWB detection circuit 86 and calculates an exposure value (an image-taking EV value) suitable for image taking. The CPU 50 determines a diaphragm value and a shutter speed on the basis of the obtained exposure value and a predetermined program line diagram. It controls the electronic shutter and the iris of the CCD 74 based on the diaphragm value and the shutter speed to obtain an appropriate amount of exposure.

Furthermore, the CPU 50 sends a command to a strobe control circuit 88 as necessary. The strobe control circuit 88 performs charge control of a main capacitor not shown, electric discharge (light emission) timing control of the strobe emission section (a xenon tube, a light emitting diode or the like) 16.

The AE/AWB detection circuit 86 calculates, for each divided area, an average integrated value for each color of the RGB signals when automatic white balance adjustment is performed, and it provides the result of the calculation to the CPU 50. Obtaining the integrated values of R, B and G, the CPU 50 determines the ratios of R/G and B/G for each divided area and determines the kind of light source, based on distribution of these R/G and B/G values in a color space with R/G and B/G axes coordinates. Then, it controls gain values for the R, G and B signals in the white balance adjustment circuit (white balance gain) according to the determined kind of light source to correct the signal of each color channel.

As the AF control in the image-taking apparatus 10, for example, contrast AF in which the focus lens 70 is moved so that the high-frequency component of the G signal in an image signal becomes the maximum is applied. The AF detection circuit 84 is configured by a high-pass filter which allows only the high-frequency component of the G signal to pass, a conversion-to-absolute-value processing section, an AF area extraction section for cutting out a signal from within an area to be targeted by focusing, which is preset within the screen (for example, at the center of the screen), and an integration section which integrates absolute value data within the AF area.

The data of the integrated value determined by the AF detection circuit 84 is notified to the CPU 50. While controlling the focus control section 70A to move the focus lens 70, the CPU 50 computes a focus evaluation value (AF evaluation value) at multiple AF detection points and determines such a lens position that the evaluation value becomes the maximum as the focused position. Then, the CPU 50 controls the focus control section 70A to move the focus lens 70 to the determined focused position. The computation of the AF evaluation value is not limited to the aspect of using the G signal. The brightness signal (Y signal) may be used.

While the AF control is performed, photometry is performed by the CCD 74. In the case where the photometric value is equal to or below a predetermined value, the AF auxiliary light lamp 18 lights up.

When the image-taking switch is half-pressed, S1 is on and AE/AF processing is performed. When the image-taking switching is fully pressed, S2 is on and an image-taking operation for recording starts. Image data acquired in response to S2 being turned on is converted to a brightness/color difference signal (a Y/C signal) by the digital signal processing section 80, and then stored in the RAM 56 after predetermined processings such as gamma correction are performed therefor.

The Y/C signal stored in the RAM 56 is compressed by a compression/expansion processing circuit 90 in accordance with a predetermined format and recorded in the recording medium 60 via the media control circuit 62. For example, a still image is recorded as an image file in the JPEG (Joint Photographic Experts Group) format.

A self-timer lamp control circuit 94 informs a photographer of execution and end of image taking and the like by lighting up, blinking or extinguishing the self-timer lamp 20 when self-timer image taking is performed.

A face detection circuit 92 detects the face of a subject person from a taken image. As an example of a method for the face detection processing, there is a method in which pixels having colors close to a color specified as skin color are taken out from an original image and the area from which the pixels have been taken out is detected as a face area. This face detection processing is performed, for example, by specifying, in a color space for distinguishing skin color from other colors, the range of skin color in the color space on the basis of information about the skin color sampled in advance and determining whether or not the color of each pixel is included within the specified range. That is, the face detection circuit 92 calculates, for each skin color area detected from the image, an evaluation value of possibility of being a face (a face possibility score) and outputs the face possibility score to the CPU 50. Here, the face possibility score is a parameter indicating whether the area detected by the face detection circuit 92 is a face area or not, and it is calculated, for example, based on the degree of skin color. When the face detection is on, the CPU 50 determines a skin color area with a face possibility score equal to or above a predetermined value to be a face area, and it controls the liquid crystal monitor 30 to display the face area of the image. The method for displaying the face area will be described later.

[Reproduction Mode]

Under the reproduction mode, the compressed data of the last image file recorded in the recording medium 60 (the image file recorded last) is read out. If the image file recorded last is a still image file, the compressed image data read out is expanded to an uncompressed YC signal via the compression/expansion processing circuit 90, converted to a signal for display via the digital signal processing section 80 and the video encoder 82 and then outputted to the liquid crystal monitor 30. Consequently, the content of the image of the image file is displayed on the screen of the liquid crystal monitor 30.

By operating the right or left button of the cross button 42 during reproduction of one frame of a still image (including reproduction of the top frame of a movie), switching of the image files to be reproduced (forward/backward frame advance) can be performed. The image file at the position specified by the frame advance is read from the recording medium 60, and a still image or a movie is reproduced and displayed on the liquid crystal monitor 30 the same as described above.

If, under the reproduction mode, an external display such as that of a personal computer or a TV is connected to the image-taking apparatus 10 via the external connection interface section, the image file recorded in the recording medium 60 is processed by the video encoder 82 and reproduced and displayed on this external display.

A voice processing circuit 96 outputs a voice signal to the speaker 22 when a voice file or an image accompanied by voice is reproduced.

[Face Detection Processing]

Figure 3:
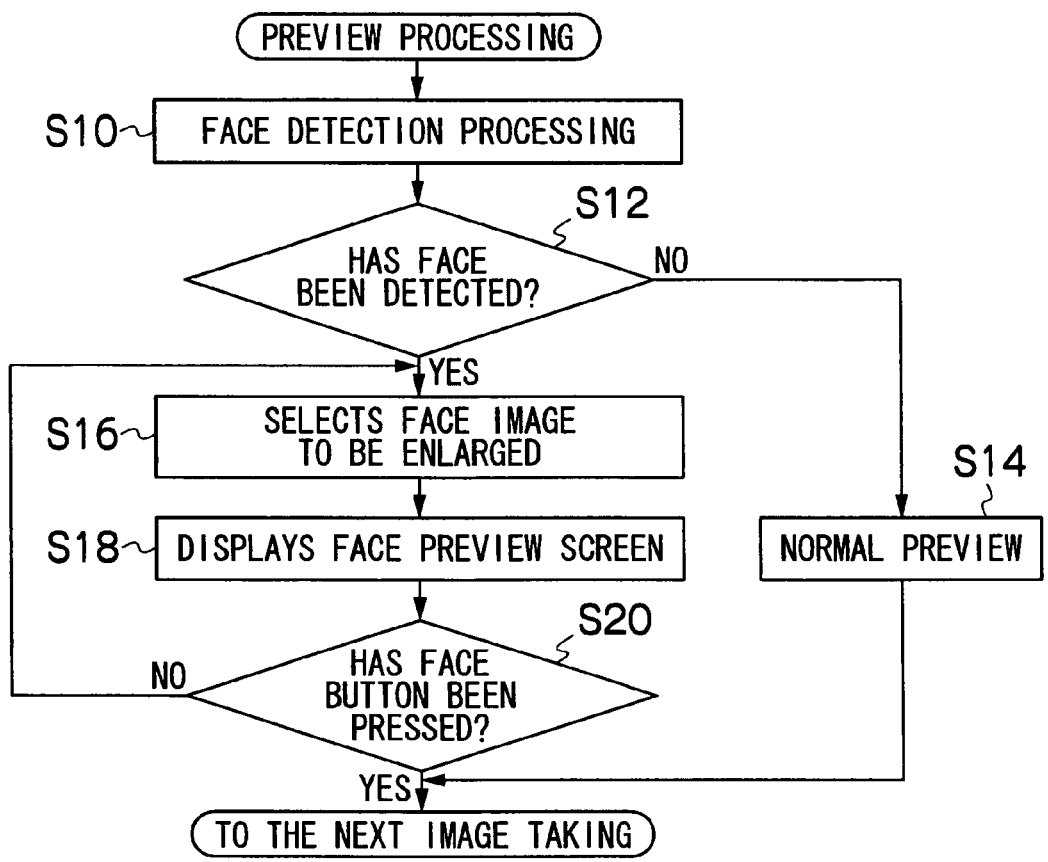
FIG. 3 is a flowchart showing processing for detecting a face from a taken image and performing preview display.

Next, description will be made on processing for detecting a face from a taken image and performing preview display thereof, with reference to the flowchart in FIG. 3. First, when the face detection is turned on by the face detection control button 46 and an image is taken, under the image-taking mode, then the face detection processing is executed for the taken image (step S10). That is, a skin color area is detected from the taken image PIC by the face detection circuit 92, and a face possibility score is detected on the basis of the degree of the skin color and the like and outputted to the CPU 50. The CPU 50 determines whether this skin color area is a face area or not on the basis of the face possibility score.

Next, if a face area is not detected from the taken image (step S12: No), then preview of the taken image PIC is displayed for a predetermined period of time (for example, one to several seconds) (normal preview; step S14). Then, the display of the liquid crystal monitor 30 transitions to the through movie image display to enable image taking of the next image.

On the other hand, if a face area is detected from the taken image (step S12: Yes), then a face image to be displayed in an enlarged state is selected (step S16), and a face preview screen is displayed on the liquid crystal monitor 30 (step S18).

Figure 4:
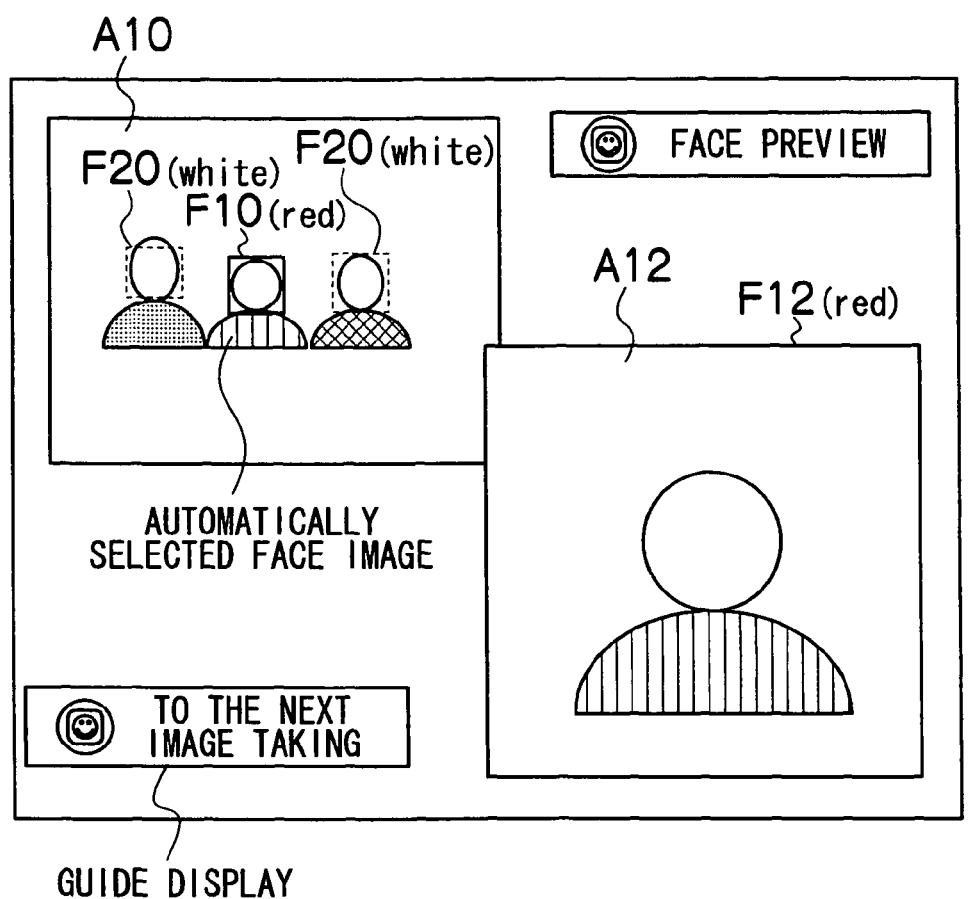
FIG. 4 shows a configuration example of a face preview screen.
Figure 5:
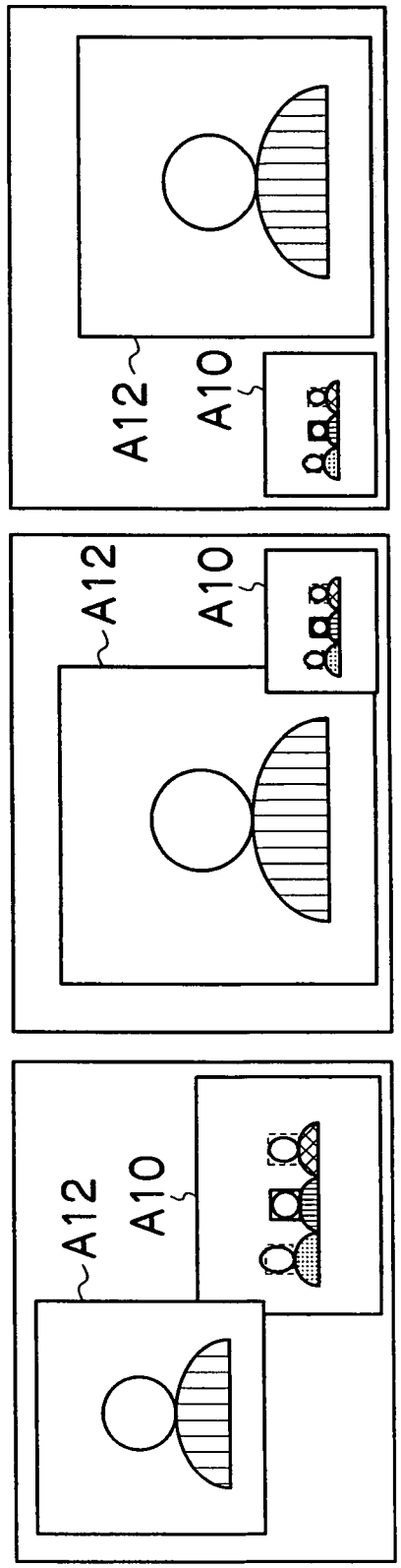
FIGS. 5A to 5C show other configuration examples of the face preview screen.

FIG. 4 shows a configuration example of the face preview screen. As shown in FIG. 4, there are provided a taken image display screen A10 for displaying a taken image PIC and an enlarged face display screen A12 for displaying a face image including a face area detected from the taken image PIC in an enlarged state on the same face preview screen. Furthermore, as shown in FIG. 4, there is shown a guide display to the effect that the next image taking is enabled by pressing the face detection control button 46, at the lower left of the face preview screen. The positional relation between the taken image display screen A10 and the enlarged face display screen A12 and the sizes of the screens are not limited to those in FIG. 4. They may be displayed, for example, as shown in FIGS. 5A to 5C. It is also possible that a user can select the positional relation between the taken image display screen A10 and the enlarged face display screen A12 and the sizes of the screens on the face preview screen.

As shown in FIG. 4, three face areas are detected from the taken image PIC. If multiple face areas are detected from the taken image PIC, the CPU 50 automatically selects a face area to be displayed in an enlarged state on the basis of the face possibility scores calculated by the face detection circuit 92 and the sizes and positions of the face areas (step S16). The automatic face area selection is performed, for example, in the following procedure. First, a face area with the largest size is selected. If there are multiple face areas with almost the same size, then a face area positioned closest to the center of the taken image PIC is selected. If there are multiple face areas with almost the same size and almost the same distance from the center of the taken image PIC, then a face area with the highest face possibility score is selected.

Next, as shown in FIG. 4, the taken image PIC is displayed on the taken image display screen A10, and the face image including the face area which has been selected at step S16 is cut out from the taken image PIC and displayed in an enlarged state on the enlarged face display screen A12. The procedure for cutting out the face image will be described later. The face areas on the taken image display screen A10 are surrounded with frames. The face area selected at step S16 is surrounded with a colored, bold and solid frame F10 (for example, in red), and the unselected face areas are surrounded with, for example, a white, thin, solid or dotted frame F20. The frame on the enlarged face display screen A12 is of the same color as the frame F10.

The face image displayed on the enlarged face display screen A12 can be displayed in an enlarged or reduced display by the zoom lever 32.

Next, if the face detection control button 46 is pressed while the face preview screen is displayed (step S20: Yes), then the taken image is stored in the recording medium 60, and the display of the liquid crystal monitor 30 transitions to the through movie image display to enable image taking of the next image.

According to this embodiment, by providing an operation member dedicated for switching on/off of the face detection processing and proceeding to the next image taking under the image-taking mode, it is possible to simplify the operation related to the face detection processing. Furthermore, by displaying a taken image and an enlarged face area image on the face preview screen at the same time, it is possible to easily perform the operation of proceeding to the next image taking after confirming the condition of focus and exposure and the face expression of a subject person.

If, at the processings of step S112 and the subsequent steps, a face area is not detected from the taken image when the face detection is on, a display to the effect that a face has not been detected may be shown, or a particular part of the image (for example, the central part) may be displayed.

Information about a photographed and detected face area (for example, the position, central coordinates, height and width and direction) may be stored in additional information about the image (for example, in an EXIF tag) or may be stored in a management file (a metafile) different from the image file so that such information is collectively managed. Furthermore, the image of the face area may be stored in a file different from the file of the taken image when the face preview screen is ended to proceed to the through movie image display. Furthermore, in the case of reproducing the image in which the face area information is stored, an icon indicating that a face has been detected in the image may be displayed together with the image. It is possible to, when reproducing the image, display a face image in an enlarged state similarly as shown in FIG. 4 with the use of the files of the face area information and the face image, without performing the face detection processing again.

In this embodiment, the taken image and the face image may be separately displayed on the face preview screen at step S18. That is, the taken image PIC is previewed first; when the face detection control button 46 is pressed, the face image including a selected face area is displayed in an enlarged state on the liquid crystal monitor 30. In this case, when the taken image PIC is displayed in an enlarged state, the detected face area is surrounded with a frame similar to that in FIG. 4. Thereby, the face image can be displayed in an enlarged state on the whole liquid crystal monitor 30. The face image may be superimposedly displayed on the face preview screen.

[Another Embodiment of the Face Detection Processing]

Figure 6:
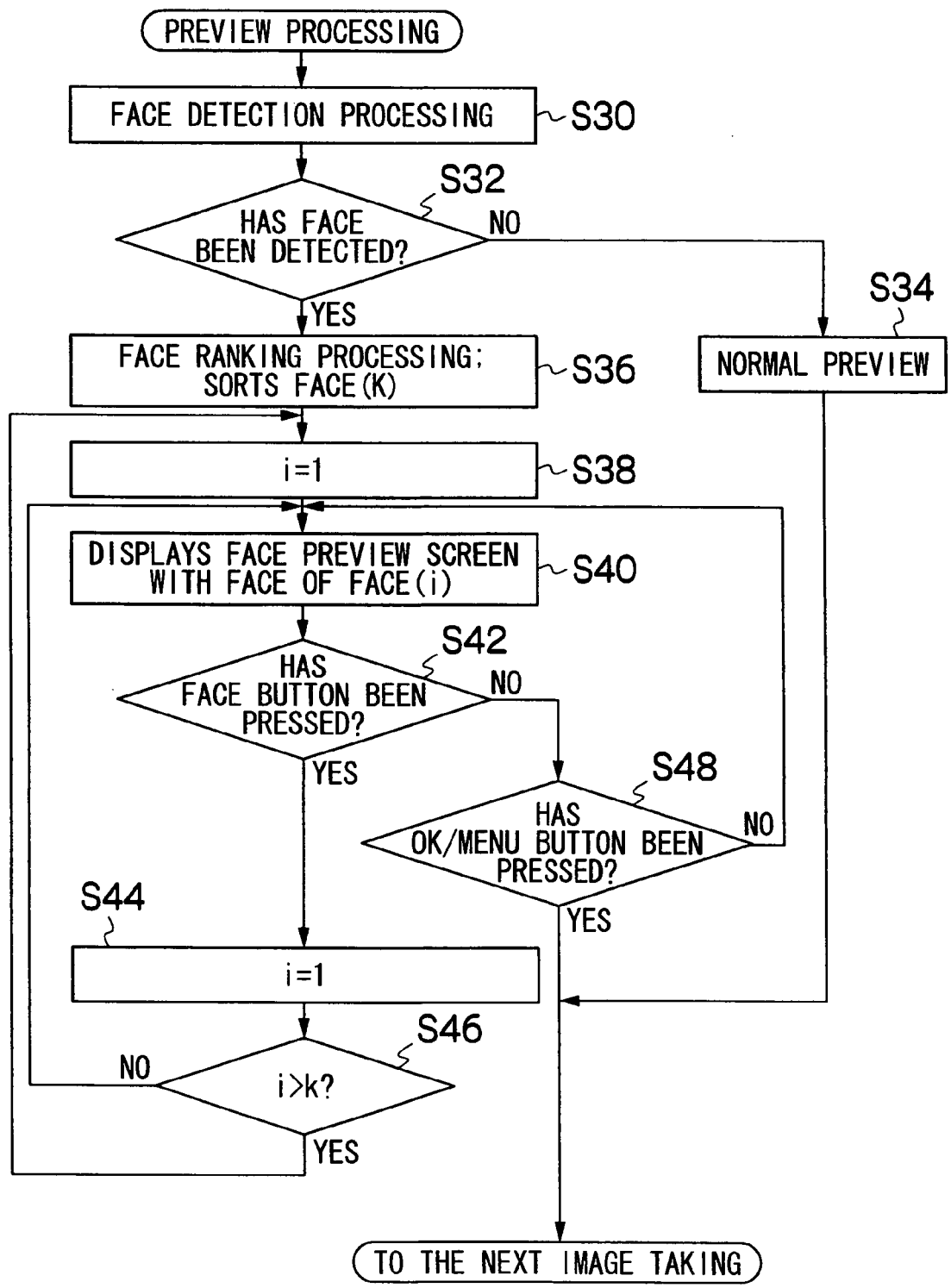
FIG. 6 is a flowchart showing another embodiment of the face detection processing and the face preview display processing.

Next, description will be made on another embodiment of the face detection processing and face preview display processing with reference to the flowchart in FIG. 6. First, when the face detection is turned on by the face detection control button 46 and an image is taken, under the image-taking mode, then the face detection processing is executed for the taken image (step S30). That is, a skin color area is detected from the taken image by the face detection circuit 92, and a face possibility score is detected on the basis of the degree of the skin color and the like and outputted to the CPU 50. The CPU 50 determines whether this skin color area is a face area or not on the basis of the face possibility score.

Next, if a face area is not detected from the taken image (step S32: No), then preview of the taken image is displayed for a predetermined period of time (for example, one to several seconds) (normal preview; step S34). Then, the display of the liquid crystal monitor 30 transitions to the through movie image display to enable image taking of the next image.

On the other hand, if k face areas are detected from the taken image (step S32: Yes), then face area ranking processing is executed, and pieces of information about the face areas are sorted in descending order of the ranking and stored in the RAM 56 (step S36). In the description below, the face areas are referred to as face(1), face(2), ..., face(k) in descending order of the ranking. The face area ranking processing is performed, for example, in the following procedure. First, the face areas are ranked in descending order of the size. Next, if there are multiple face areas with almost the same size, then they are ranked in descending order of closeness to the center of the taken image. Then, if there are multiple face areas with almost the same size and almost the same distance from the center of the taken image, then the face areas are ranked in descending order of the face possibility score.

Next, a parameter i which specifies a face area to be displayed in an enlarged state is set to 1, and the first-rank face area face(1) is selected (step S38). Then, the face preview screen is displayed on the liquid crystal monitor 30, and a face image including the selected face area face(1) is cut out from the taken image PIC and displayed in an enlarged state (step S40).

Figure 7A:
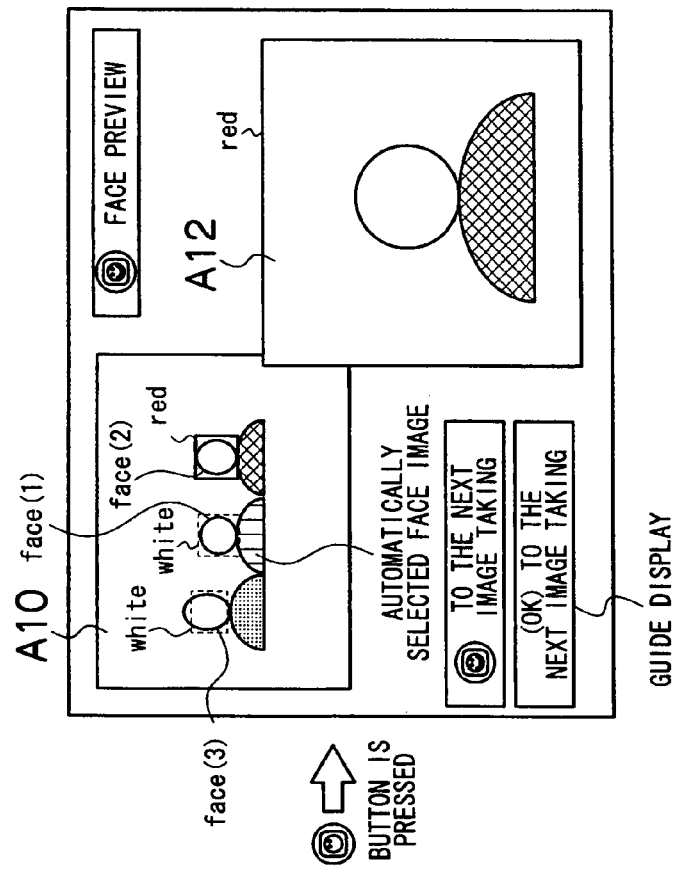
FIGS. 7A and 7B show a configuration example of the face preview screen.
Figure 7B:
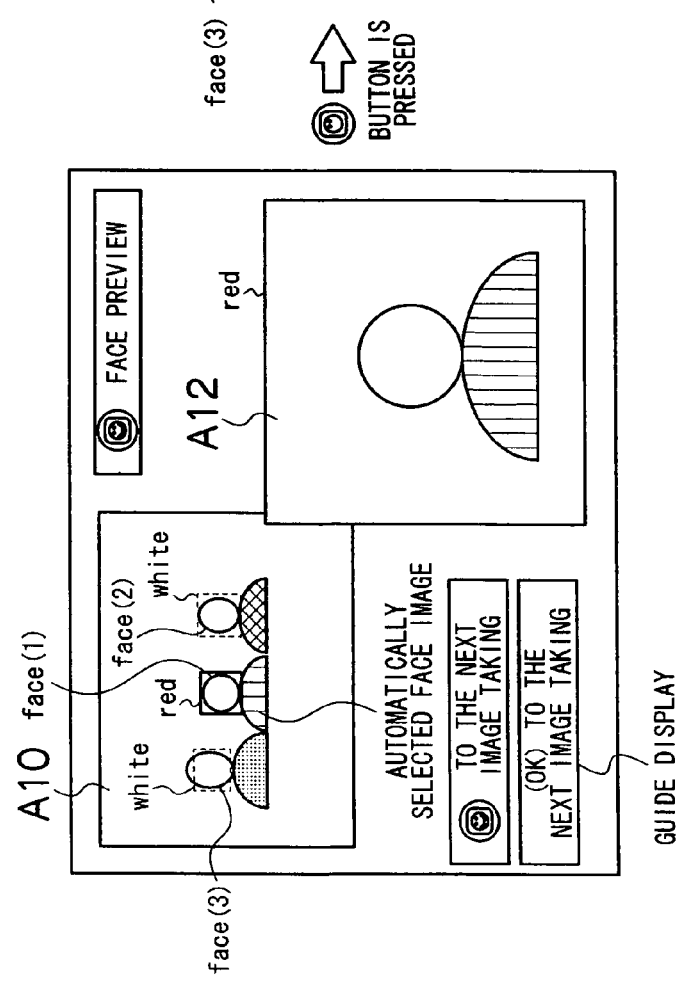

FIGS. 7A and 7B show a configuration example of the face preview screen according to this embodiment. On the face preview screen, a taken image is displayed on the taken image display screen A10, and a face image including the face area face(1) is cut out from the taken image PIC and displayed in an enlarged state on the enlarged face display screen A12, as shown in FIG. 7A. The procedure for cutting out a face image will be described later. The face areas face(1) to face(3) on the taken image display screen A10 are surrounded with frames, and the enlarged face display screen A12 is surrounded with a frame of the same color as the face area face(1) on the taken image display screen A10. The face areas face(2) and face(3) which are not displayed in an enlarged state are surrounded with, for example, white, thin, and solid or dotted frames.

Next, if the face detection control button 46 is pressed (step S42: Yes), 1 is added to the parameter i, and i=2 is obtained (step S44). If the parameter i (=2) is equal to or below the number of detected faces k (step S46: No), then the face area face(2) is selected and displayed in an enlarged state on the enlarged face display screen A12 as shown in FIG. 7B (step S40).

By repeating the processings of steps S40 to S46, enlarged display of the face area face(i) is sequentially performed. If the parameter i is larger than k (step S46: Yes), then parameter i is set to 1 (step S38), and the face area face(1) is displayed in an enlarged state on the enlarged face display screen A12 (step S40).

If the OK/MENU button 40 is pressed (step S42: No; step S48: Yes) while the face preview screen is displayed (step S40), then, the taken image is stored in the recording medium 60, and the display of the liquid crystal monitor 30 transitions to the through movie image display to enable image taking of the next image.

According to this embodiment, by providing operation members dedicated for switching on/off of the face detection processing and for switching from the face preview screen to a through movie image under the image-taking mode, it is possible to simplify the operation related to the face detection processing. Furthermore, by displaying a taken image and enlarged display of a face area on the face preview screen at the same time, it is possible to easily perform the operation of proceeding to the next image taking after confirming the condition of focus and exposure and the face expression of a subject person.

In this embodiment, the taken image and the face image may be separately displayed on the face preview screen at step S40. That is, preview of the taken image PIC is displayed first; and, when the face detection control button 46 is pressed, the face image face(i) (i=1) is displayed in an enlarged state on the liquid crystal monitor 30. In this case, when the taken image PIC is displayed in an enlarged state, the face images face(1), . . . are surrounded with frames similar to the frames in FIGS. 7A and 7B. Then, each time the face detection control button 46 is pressed, 1 is added to the parameter i, and the face areas face(2), face(3), . . . are sequentially displayed in an enlarged state. When the face detection control button 46 is pressed while the last face image face(k) is displayed, the liquid crystal monitor 30 is controlled to transition to the through movie image display to enable image taking of the next image. Thereby, the face image can be displayed in an enlarged state on the whole liquid crystal monitor 30. The face image may be superimposedly displayed on the face preview screen.

[Processing for Displaying a Face Area in an Enlarged State]

Next, description will be made on a procedure for displaying a face area in an enlarged state. FIGS. 8 to 11 are diagrams illustrating a method for cutting out a face area from a taken image PIC. As shown in FIGS. 8A and 8B, it is assumed that:

kH: the height of a face area "face" (the number of pixels);

kW: the width of the face area "face" (the number of pixels);

cH: a calculated value of the height of a rectangular area P10 to be cut out from the taken image PIC and displayed in an enlarged state (CH=kH×mag; the "mag" is a parameter indicating the range of the area to be displayed in an enlarged state; mag=3 in this embodiment);

cW: a calculated value of the width of the rectangular area P10 to be cut out from the taken image PIC and displayed in an enlarged state (CW=kW×mag; mag=3 in this embodiment);

rh: the height of the enlarged face display screen A12 (the number of pixels);

rw: the width of the enlarged face display screen A12 (the number of pixels);

(x, y): the coordinates of the center C of the face area (the number of pixels);

the number of horizontal-direction pixels of the liquid crystal monitor 30: dw;

the number of vertical-direction pixels of the liquid crystal monitor 30: dh;

the number of horizontal-direction pixels of the taken image PIC: pW; and the number of vertical-direction pixels of the taken image PIC: pH.

As shown in FIG. 8A, if both of the condition 1 (expressions (1-1) and (1-2)) and the condition 2 (expressions (2-1) and (2-2)) shown below are satisfied, that is, if the rectangular area P10 with the point C (x, y) as the center and with the height cH and the width cW is within the taken image PIC, and the height cH and the width cW (the number of pixels) of the rectangular area P10 are equal to or above the height rh and the width rw of the enlarged face display screen A12, respectively, then the rectangular area P10 is cut out from the taken image PIC as a face image to be displayed on the enlarged face display screen A12 and displayed in an enlarged state on the enlarged face display screen A12 of the face preview screen as shown in FIG. 8B.

[Condition 1]

$$rh \leq cH < pH \quad (1\text{-}1)$$

$$rw \leq cW < pW \quad (1\text{-}2)$$

[Condition 2]

$$0.5 \times cW < x < pW - 0.5 \times cW \quad (2\text{-}1)$$

$$0.5 \times cH < y < pH - 0.5 \times cH \quad (2\text{-}2)$$

Figures 1, 9B:
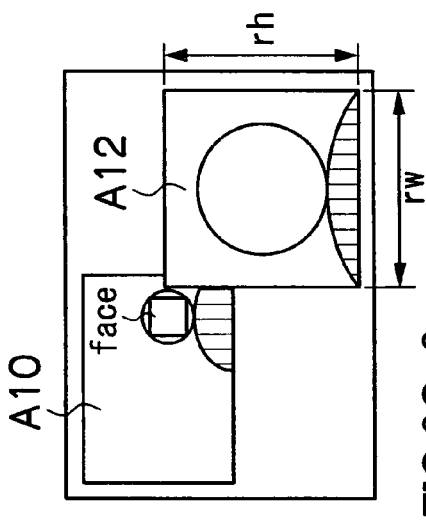
Figures 2, 9B:
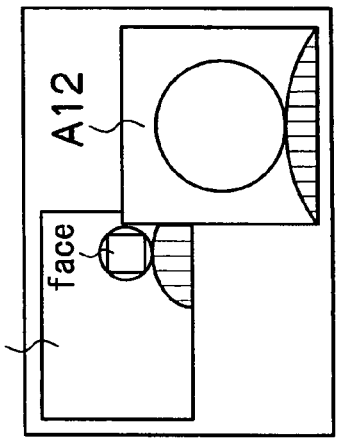
Figures 1, 9C:
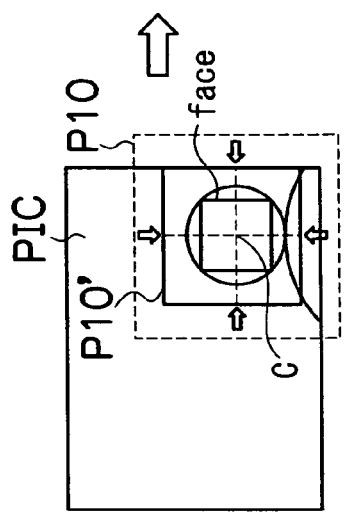
Figures 2, 9C:
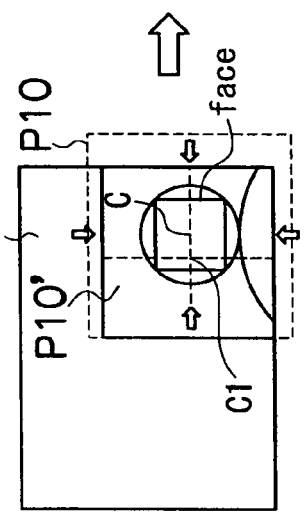
Figure 9A:
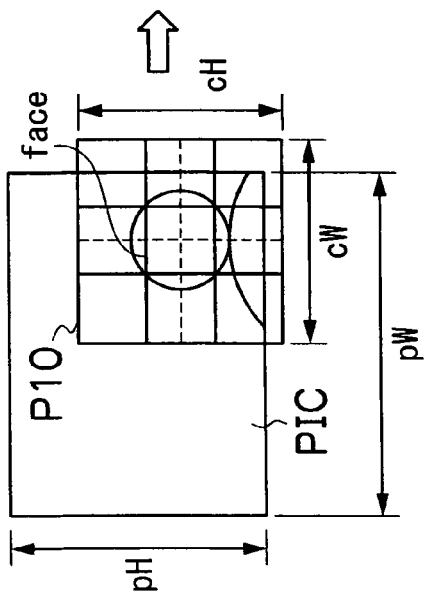

If the above condition 2 is not satisfied and any of cH>pH and cW>pW is satisfied, the rectangular area P10 is beyond the taken image PIC as shown in FIG. 9A. Therefore, the area to be cut out is adjusted. First, the rectangular area P10 is reduced with the point C (x, y) as the center so that it is included within the taken image PIC. Then, if the height cH' and the width cW' of the reduced rectangular area P10' satisfy cH'≧rh and cW'≧rw, respectively, then the reduced rectangular area P10' is cut out from the taken image PIC as the face image to be displayed on the enlarged face display screen A12 as shown in FIG. 9B-2 and displayed in an enlarged state on the enlarged face display screen A12 of the face preview screen.

On the other hand, in the case of cH'<rh or cW'<rw, the rectangular area P10' is enlarged so that it is included in the taken image PIC and satisfy cH'≧rh and cW'≧rw, as shown in FIG. 9C-1. Then, as shown in FIG. 9C-2, this enlarged the rectangular area P10" is cut out from the taken image PIC as the face image to be displayed on the enlarged face display screen A12 and displayed in an enlarged state on the enlarged face display screen A12 of the face preview screen. In the example shown in FIGS. 9C-1 and 9C-2, the center C1 of this enlarged rectangular area P10" does not necessarily correspond to the center of the face area "face".

Figure 10:
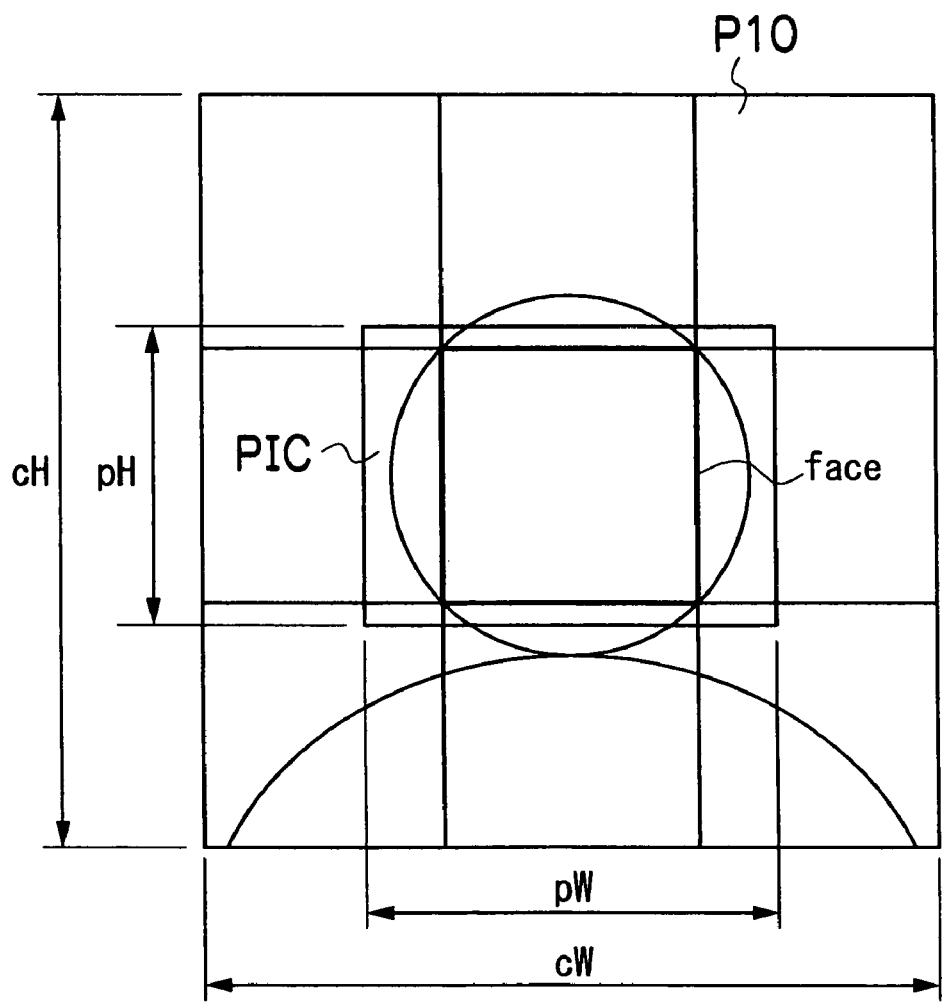
FIG. 10 illustrates the method for cutting out a face area from the taken image PIC.

As shown in FIG. 10, in the case of cH>pH or cW>pW, that is, if the face area "face" is very large relative to the taken image PIC, then the face area "face" is cut out from the taken image PIC as the face image to be displayed on the enlarged face display screen A12 and displayed in an enlarged state on the enlarged face display screen A12 of the face preview screen.

Figure 11:
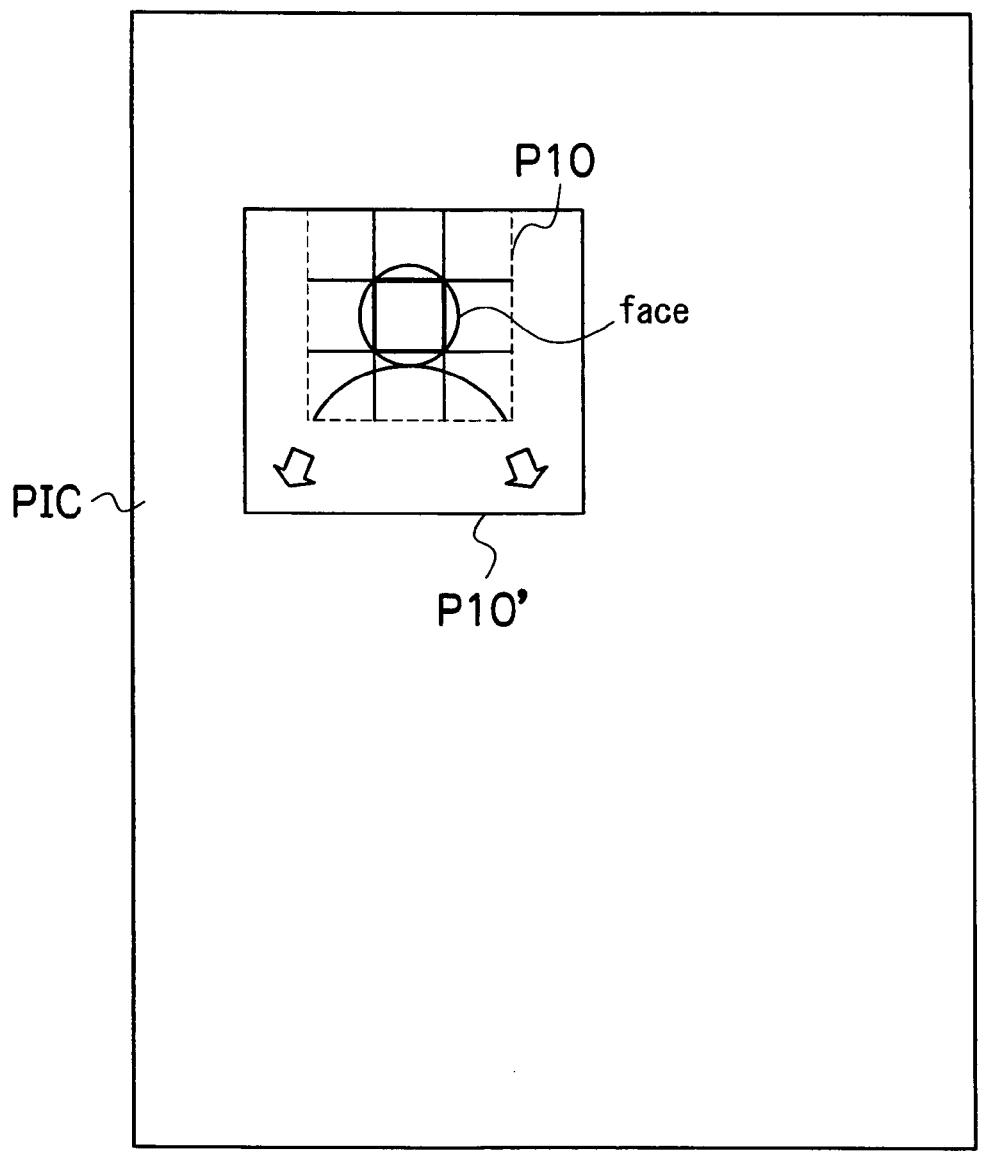
FIG. 11 illustrates the method for cutting out a face area from the taken image PIC.

As shown in FIG. 11, in the case of cH<rh or cW<rw, that is, if the size (the number of pixels) of the rectangular area P10 is small relative to the enlarged face display screen A12, then the rectangular area P10 is enlarged downward below the face area "face" so as to satisfy cH≧rh and cW≧rw, and the enlarged rectangular area P10' is cut out from the taken image PIC as the face image to be displayed on the enlarged face display screen A12 and displayed in an enlarged state on the enlarged face display screen A12 of the face preview screen. Whether the upside of the face is up or down is determined, for example, from the positions of the eyes (in black), eyebrows, nose and mouth within the face area "face". If the rectangular area P10 reaches the edge of the taken image PIC when the rectangular area P10 is enlarged, then the rectangular area P10 is enlarged in a direction opposite to the edge.

That is, if the face area "face" is large enough, the face area "face" corresponding to the central part of the face is cut out; if the face area "face" is small, an area including the lower side of the face (for example, a bust shot (a shot of a person including the bust and the part above the bust) or a knee shot (a shot of a person including the knees and the part above the knees) is cut out. Then, the cut-out area is displayed in an enlarged state on the enlarged face display screen A12 of the face preview screen.

Figure 12:
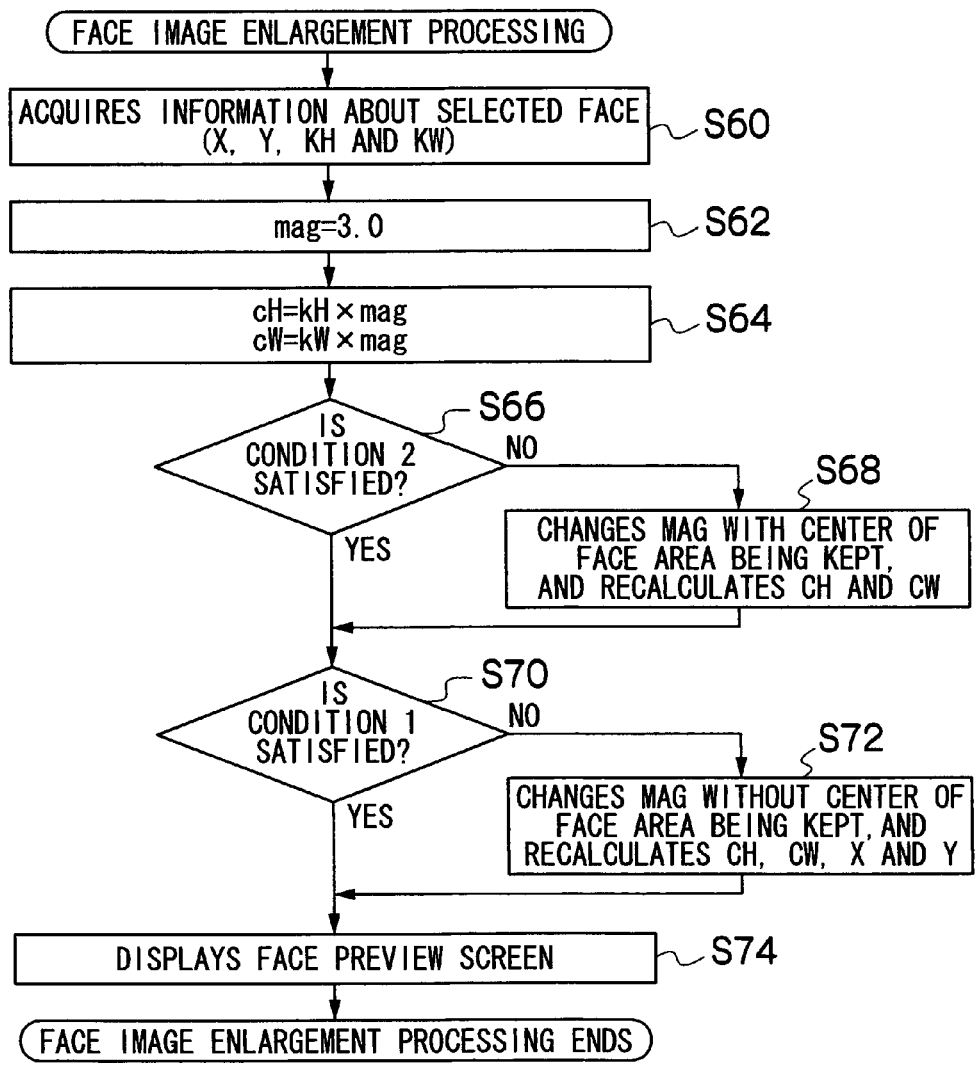
FIG. 12 is a flowchart showing processing for displaying a face area in an enlarged state.

FIG. 12 is a flowchart showing the processing for displaying a face area in an enlarged state. First, face information (the coordinates of the center C (x, y); kH; kW) about the face area "face" selected to be displayed in an enlarged state is obtained (step S60), and the parameter mag is set to a default value 3.0 (step S62). Then, the values of CH (=kH×mag) and CW (=kW×mag) are calculated (step S64).

Next, if not only the condition 2 is satisfied (step S66: Yes) but also the condition 1 is satisfied (step S70: Yes), that is, if the rectangular area P10 with the height cH and width cW and with the point C (x, y) as the center is within the taken image PIC, and the height cH and width cW (the number of pixels) of the rectangular area P10 are equal to or above the height rh and width rw of the enlarged face display screen A12, respectively, as shown in FIGS. 8A and 8B, then the rectangular area P10 with the height cH and width cW and with the point C (x, y) as the center is cut out from the taken image PIC and displayed in an enlarged state on the enlarged face display screen A12 of the face preview screen (step S74).

If the condition 2 is not satisfied (step S66: No), that is, if the rectangular area P10 is not included within the taken image PIC, the rectangular area P10 is reduced with the point C (x, y) as the center so that it is included within the taken image PIC (step S68), by reducing the value of the parameter mag. If the condition 2 is not satisfied (step S66: No) but the condition 1 is satisfied (step S70: Yes), then the reduced rectangular area P10' is cut out from the taken image PIC and displayed in an enlarged state on the enlarged face display screen A12 of the face preview screen (step S74; see FIGS. 9B-1 and 9B-2).

If neither the condition 2 nor the condition 1 is satisfied (step S66: No; step S70: No), then the value of mag is changed so that the height cH' and width cW' of the rectangular area P10' satisfy cH'$\geq$rh and cW'$\geq$rw, respectively, and the rectangular area P10' is enlarged (step S72). Then, this enlarged rectangular area P10" is cut out from the taken image PIC and displayed in an enlarged state on the enlarged face display screen A12 of the face preview screen (step S74; see FIGS. 9C-1, 9C-2 or FIG. 10). In this case, the center C1 of the enlarged the rectangular area P10" does not necessarily correspond to the center C of the face area "face".

On the other hand, if the condition 2 is satisfied (step S66: Yes) but the condition 1 is not satisfied (step S70: No), the parameter mag is changed so that the condition 1 is satisfied, and the size and the center coordinates of the rectangular area P10 are changed (step S72). Then, the changed rectangular area P10' is cut out from the taken image PIC and displayed in an enlarged state on the enlarged face display screen A12 of the face preview screen (step S74; see FIG. 11, for example).

According to this embodiment, by setting the number of vertical pixels and the number of horizontal pixels of an area to be displayed in an enlarged state to be equal to or above the number of vertical pixels and the number of horizontal pixels of the enlarged face display screen A12, respectively (the condition 1), it is possible to utilize the resolution of the liquid crystal monitor 30 to the maximum when confirming the condition of focus and exposure and the face expression of a subject person in enlarged face-area display. For example, in the case where a face area "face" in a taken image PIC is small relative to the enlarged face display screen A12, the enlarged display may be unclear and confirmation of focus and the like may be difficult if the face area "face" is displayed in an enlarged state by performing interpolation of pixels or the like. According to this embodiment, this can be avoided.

It is also possible to set the upper limit value of the zoom magnification according to the size of the enlarged face display screen A12 to avoid the interpolation of face image pixels when the rectangular area is displayed in an enlarged state by the zoom lever 32.

Furthermore, in this embodiment, it is also possible to enable the allowable range of pixel interpolation to be set when a face area is displayed in an enlarged state according to the size of the enlarged face display screen A12, for example, by setting the condition 1 as rh/n$\leq$cH<pH; rw/n$\leq$cW<pW.

Second Embodiment

Figure 14:
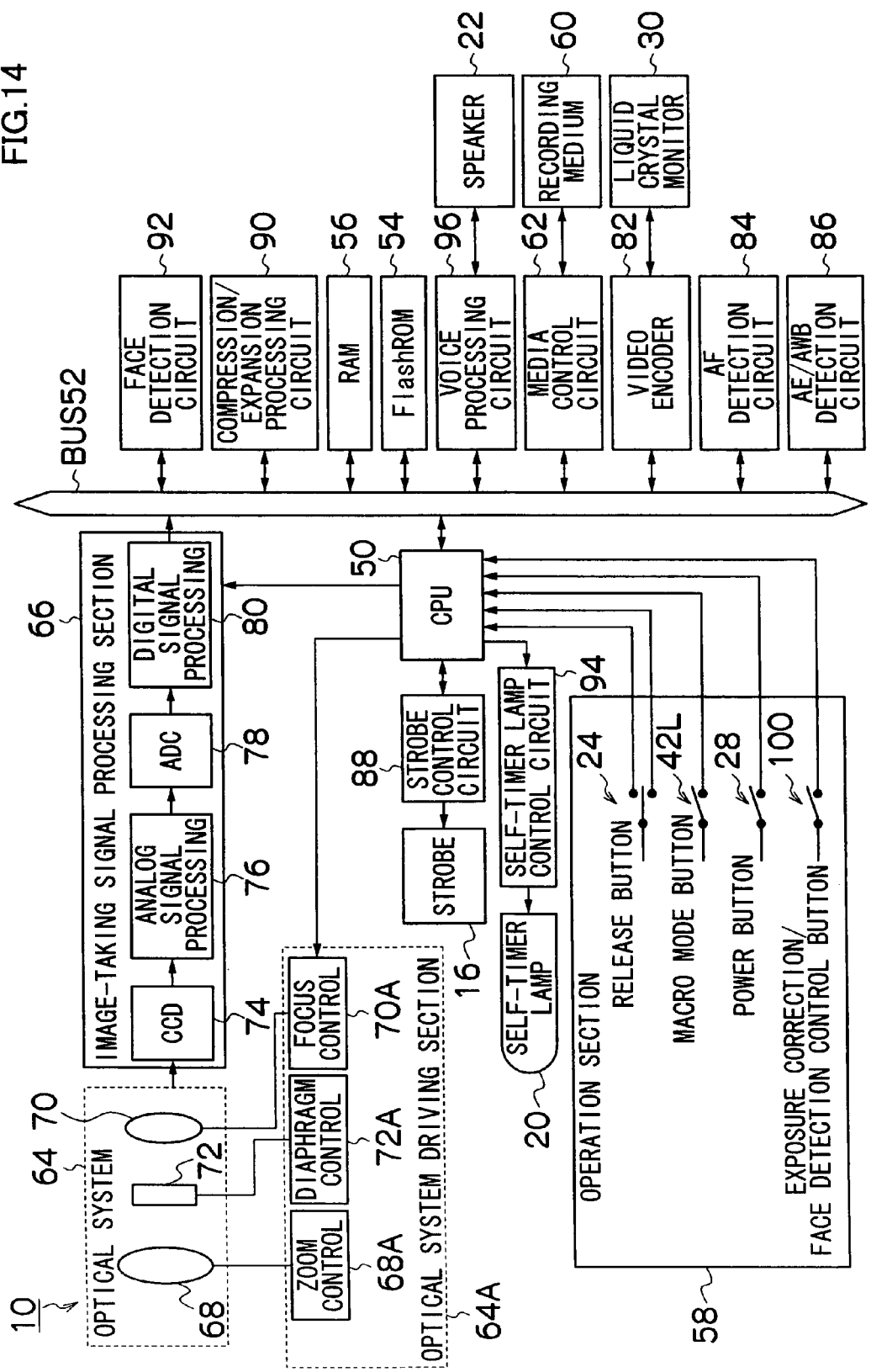
FIG. 14 is a block diagram showing the internal configuration of the image-taking apparatus according to the second embodiment of the present invention.

Next, a second embodiment of the present invention will be described. FIGS. 13A and 13B show the external view of the back of an image-taking apparatus according to a second embodiment of the present invention, and FIG. 14 is a block diagram showing the internal configuration thereof. In the description below, such components as are similar to those in the first embodiment are given the same reference numerals, and description thereof will be omitted.

As shown in FIGS. 13 and 14, the image-taking apparatus 10 of to this embodiment is provided with an exposure correction/face detection control button 100 instead of the face detection control button 46. The exposure correction/face detection control button 100 functions not only as a button for correcting exposure under the image-taking mode but as a button for setting on/off of face detection. That is, by pressing the exposure correction/face detection control button 100 under the image-taking mode, a scale for exposure correction is displayed on a liquid crystal monitor 30, and exposure can be corrected by a left button 42L and a right button 42R. Furthermore, by pressing the exposure correction/face detection control button 100 multiple times under the image-taking mode, on/off of the face detection can be set. When the face detection is set to on under the image-taking mode, an icon indicating that the face detection is set to on (hereinafter referred to as a face icon) is displayed on the liquid crystal monitor 30. It is preferable that this face icon is arranged at a position where it does not interfere with confirmation of the angle of view, such as at the upper left of the liquid crystal monitor 30. During the preview display shown immediately after an image is taken or under the reproduction mode, the exposure correction/face detection control button 100 functions as a button for selecting a face in the image or ending the face preview display screen to proceed to the next image taking. The exposure correction function is disabled during preview display.

[Processing for Changing the Image-Taking Mode]

Figure 15:
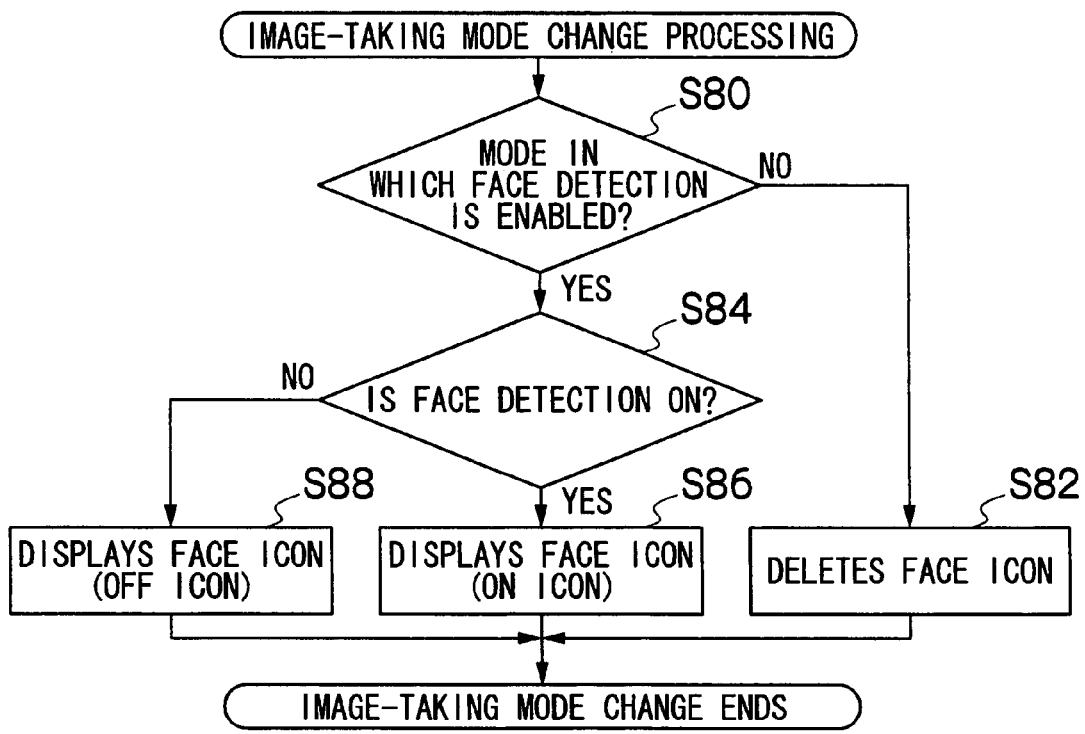
FIG. 15 is a flowchart showing processing for setting on/off of face detection when changing the image-taking mode.

Next, description will be made on processing for setting on/off of the face detection when changing the image-taking mode in the image-taking apparatus of this embodiment, with reference to the flowchart in FIG. 15. First, when a mode dial 26 is operated to change an image-taking mode under the image-taking mode, the setting position of the mode dial 26 is detected by a CPU 50, and it is determined whether the mode is such a mode that enables the face detection (step S80). At step S80, if a scene position mode is set by the mode dial 26, and an image-taking mode under which the face detection is difficult, such as an underwater image-taking mode, a close-up mode for taking a close-up photograph of a flower or the like, or a text sentence image-taking mode for recognizing text by OCR is set, the mode is determined to be an image-taking mode in which the face detection is disabled (step S80: No). The face detection processing and display of a face preview screen to be performed after image taking are disabled, irrespective of the setting of on/off of the face detection, and a face icon on the liquid crystal monitor 30 is deleted (step S82).

Figure 16A:
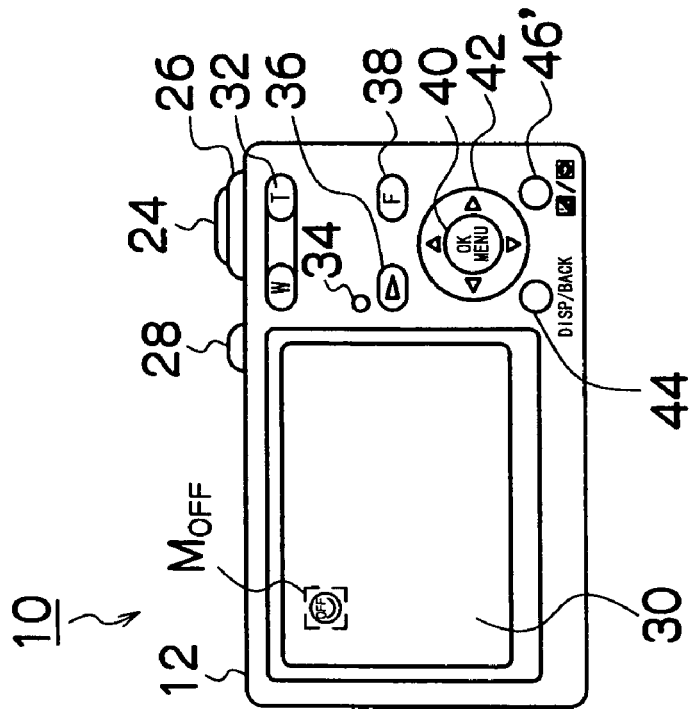
FIGS. 16A and 16B show a configuration example of a face icon.

If it is determined at step S80 that the image-taking mode is such a mode that enables the face detection (for example, an automatic image-taking mode, a manual image-taking mode or a movie shooting mode) (step S80: Yes), then it is determined whether the face detection is set to on or off (step S84). If the face detection is set to on by the exposure correction/face detection control button 100 (step S84: Yes), a face icon $M_{on}$ indicating that the face detection is set to on is displayed on the liquid crystal monitor 30 as shown in FIG. 16A (step S86). When an image is taken while the face icon $M_{on}$ is displayed, the face of a subject person is detected from the taken image, the face preview screen is displayed, and enlarged display of the face can be viewed, similarly to the first embodiment.

Figure 16B:
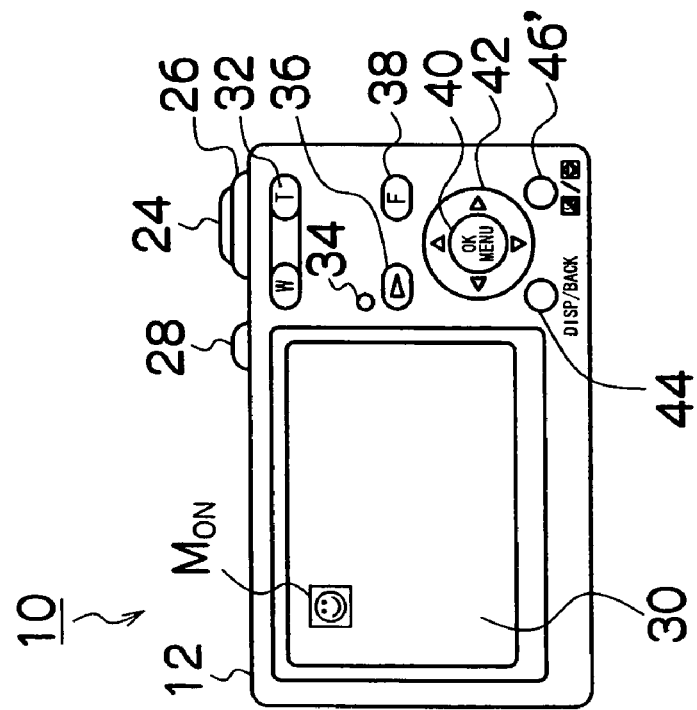

On the other hand, if the face detection is set to off (step S84: No), a face icon $M_{off}$ indicating that the face detection is set to off is displayed on the liquid crystal monitor 30 as shown in FIG. 16B (step S88). When an image is taken while the face icon $M_{off}$ is displayed, normal preview display is performed.

Though the same button is used as the exposure correction button and the face detection control button in this embodiment, a different button, such as a sensitivity adjustment button for adjusting the ISO sensitivity and a camera shake reduction mode transition button for transitioning to a camera shake reduction mode, and the face detection control button may be the same button. Furthermore, the same button may be used both as a button which is disabled during such an image-taking mode that enables the face detection or during the preview display and as the face detection control button.

According to this embodiment, by using an operation member dedicated for switching on/off of the face detection processing and switching from the face preview screen to a through movie image also as a different operation member, under the image-taking mode, it is possible to reduce the number of the operation members constituting the image-taking apparatus 10 and simplify the configuration of the operation members, and thereby the operation of face detection can be facilitated.

Furthermore, according to this embodiment, it is possible to perform the face detection processing only under such an image-taking mode that enables the face detection processing. Furthermore, according to this embodiment, by providing a face icon indicating on/off of the face detection and preventing the face icon from being displayed on the liquid crystal monitor 30 under such an image-taking mode that disables the face detection, it is possible to confirm whether or not the image-taking mode is a mode in which the face detection is enabled. This makes it easy to confirm the face detection processing.

The image-taking apparatus of the present invention is applicable to apparatuses having a function of taking an image and reproducing and displaying it, such as a mobile phone, a personal digital assistant (PDA), a portable photo player and a personal computer.

What is claimed is:

1. An image-taking apparatus comprising:
   an image-taking device which takes an image of a subject;
   a display device which displays the image taken by the image-taking device;
   a face detection device which detects a face of a person who is the subject, from the taken image;
   a face detection control button for inputting an instruction to set on/off of face detection processing performed by the face detection device; and
   a display control device which controls the face detection device to execute the face detection processing for an image taken when the face detection processing is set to on, and causes the display device to display a face image including a face area detected from the taken image, wherein,
   when a number of horizontal pixels of an area including the face image and to be cut out from the taken image to be displayed on a face display screen of the display device are less than a number of horizontal pixels of the face display screen, or when a number of vertical pixels of the area to be cut out are less than a number of vertical pixels of the face display screen, the face detection device enlarges a height and/or width of the area to be cut out so that the number of vertical pixels and the number of horizontal pixels of the area to be cut out are equal to or greater than the number of vertical pixels and the number of horizontal pixels of the face display screen, respectively.

2. The image-taking apparatus according to claim 1, wherein
   the display control device causes the display device to display the face image when preview display of the taken image is shown after the image-taking; and
   the image-taking apparatus further comprises a display switching device which ends the preview display in response to an instruction from the face detection control button.

3. The image-taking apparatus according to claim 1, further comprising a face image switching device which, if multiple face areas are detected from the taken image, switches the face image displayed on a face display screen of the display device to a different face image in response to an instruction from the face detection control button.

4. The image-taking apparatus according to claim 2, further comprising a face image switching device which, if multiple face areas are detected from the taken image, switches the face image displayed on a face display screen of the display device to a different face image in response to an instruction from the face detection control button.

5. The image-taking apparatus according to claim 1, wherein the display control device displays the face image and the taken image on the display device at the same time.

6. The image-taking apparatus according to claim 4, wherein the display control device displays the face image and the taken image on the display device at the same time.

7. The image-taking apparatus according to claim 1, wherein the face detection control button is also used as a different operation member which is not used while the face image is displayed.

8. The image-taking apparatus according to claim 6, wherein the face detection control button is also used as a different operation member which is not used while the face image is displayed.

9. The image-taking apparatus according to claim 1, wherein the display control device cuts out the area to be cut out including the face image which has been detected by the face detection device from the taken image to display the cut-out area on the display device, and, if the cut-out area overlaps with an edge of the taken image, reduces the cut-out area including the face area so that it does not overlap with the edge.

10. An image-taking apparatus comprising:
    an image-taking device which takes an image of a subject;
    a display device which displays the image taken by the image-taking device;
    a face detection device which detects a face of a person who is the subject, from the taken image;
    an image-taking mode setting device which sets an image-taking mode for taking an image by the image-taking device;
    a face detection control button for inputting an instruction to set on/off of face detection processing performed by the face detection device; and
    a display control device which controls the face detection device to execute the face detection processing for an image taken when such an image-taking mode that enables the face detection processing is set and the face detection processing is set to on, and causes the display device to display a face image including a face area detected from the taken image, wherein,
    when a number of horizontal pixels of an area including the face image and to be cut out from the taken image to be displayed on a face display screen of the display device are less than a number of horizontal pixels of the face display screen, or when a number of vertical pixels of the area to be cut out are less than a number of vertical pixels of the face display screen, the face detection device enlarges a height and/or width of the area to be cut out so that the number of vertical pixels and the number of horizontal pixels of the area to be cut out are equal to or greater than the number of vertical pixels and the number of horizontal pixels of the face display screen, respectively.

11. The image-taking apparatus according to claim 10, wherein
the display control device causes the display device to display the face image when preview display of the taken image is shown after the image-taking; and
the image-taking apparatus further comprises a display switching device which ends the preview display in response to an instruction from the face detection control button.

12. The image-taking apparatus according to claim 10, further comprising a face image switching device which, if multiple face areas are detected from the taken image, switches the face image displayed on a face display screen of the display device to a different face image in response to an instruction from the face detection control button.

13. The image-taking apparatus according to claim 11, further comprising a face image switching device which, if multiple face areas are detected from the taken image, switches the face image displayed on a face display screen of the display device to a different face image in response to an instruction from the face detection control button.

14. The image-taking apparatus according to claim 10, wherein the display control device displays the face image and the taken image on the display device at the same time.

15. The image-taking apparatus according to claim 13, wherein the display control device displays the face image and the taken image on the display device at the same time.

16. The image-taking apparatus according to claim 10, wherein the face detection control button is also used as a different operation member which is not used while the face image is displayed.

17. The image-taking apparatus according to claim 15, wherein the face detection control button is also used as a different operation member which is not used while the face image is displayed.

18. The image-taking apparatus according to claim 10 wherein the display control device cuts out the area to be cut out including the face image which has been detected by the face detection device from the taken image to display the cut-out area on the display device, and, if the cut-out area overlaps with an edge of the taken image, reduces the cut-out area including the face area so that it does not overlap with the edge.

19. An image display control method comprising:
an image-taking step of taking an image of a subject;
a step of setting on/off of face detection processing, by a face detection control button for inputting an instruction to set on/off of the face detection processing; and
a display control step of executing, for an image taken when the face detection processing is set to on, the face detection processing for detecting a face area of the subject, and displaying a face image including the face area detected from the taken image on a display device, wherein
the display control step includes a step of, when a number of horizontal pixels of an area including the face image and to be cut out from the taken image to be displayed on a face display screen of the display device are less than a number of horizontal pixels of the face display screen, or when a number of vertical pixels of the area to be cut out are less than a number of vertical pixels of the face display screen, enlarging a height and/or width of the area to be cut out so that the number of vertical pixels and the number of horizontal pixels of the area to be cut out are equal to or greater than the number of vertical pixels and the number of horizontal pixels of the face display screen, respectively.

20. The image display control method according to claim 19, wherein
at the display control step, the face image is displayed when preview display of the taken image is shown after the image taking; and
the method further comprises a display switching step of ending the preview display in response to an instruction from the face detection control button.

21. The image display control method according to claim 19, further comprising a face image switching step of, if multiple face areas are detected from the taken image, switching the face image displayed on a face display screen of the display device to a different face image in response to an instruction from the face detection control button.

22. The image display control method according to claim 20, further comprising a face image switching step of, if multiple face areas are detected from the taken image, switching the face image displayed on a face display screen of the display device to a different face image in response to an instruction from the face detection control button.

23. The image display control method according to claim 19, wherein, at the display control step, the face image and the taken image are displayed on a display device at the same time.

24. The image display control method according to claim 22, wherein, at the display control step, the face image and the taken image are displayed on a display device at the same time.

25. The image display control method according to claim 19, wherein
the display control step includes the steps of:
cutting out the area to be cut out including the face image which has been detected by the face detection processing from the taken image to display the cut-out area on the display device; and
if the cut-out area overlaps with an edge of the taken image, reducing the cut-out area including the face area so that it does not overlap with the edge.

26. An image display control method comprising:
an image-taking step of taking an image of a subject;
an image-taking mode setting step of setting an image-taking mode for taking the image;
a step of setting on/off of face detection processing by a face detection control button for inputting an instruction to set on/off of the face detection processing; and
a display control step of executing, for an image taken when such an image-taking mode that enables the face detection processing is set and the face detection processing is set to on, the face detection processing for detecting a face area of the subject, and displaying a face image including the face area detected from the taken image on a display device, wherein the display control step includes a step of, when a number of horizontal pixels of an area including the face image and to be cut out from the taken image to be displayed on a face display screen of the display device are less than a number of horizontal pixels of the face display screen, or when a number of vertical pixels of the area to be cut out are less than a number of vertical pixels of the face display screen, enlarging a height and/or width of the area to be cut out so that the number of vertical pixels and the number of horizontal pixels of the area to be cut out are equal to or greater than the number of vertical pixels and the number of horizontal pixels of the face display screen, respectively.

27. The image display control method according to claim 26, wherein
at the display control step, the face image is displayed when preview display of the taken image is shown after the image taking; and
the method further comprises a display switching step of ending the preview display in response to an instruction from the face detection control button.

28. The image display control method according to claim 26, further comprising a face image switching step of if multiple face areas are detected from the taken image, switching the face image displayed on a face display screen of the display device to a different face image in response to an instruction from the face detection control button.

29. The image display control method according to claim 27, further comprising a face image switching step of, if multiple face areas are detected from the taken image, switching the face image displayed on a face display screen of the display device to a different face image in response to an instruction from the face detection control button.

30. The image display control method according to claim 26, wherein, at the display control step, the face image and the taken image are displayed on a display device at the same time.

31. The image display control method according to claim 29, wherein, at the display control step, the face image and the taken image are displayed on a display device at the same time.

32. The image display control method according to claim 26, wherein
the display control step includes the steps of:
cutting out the area to be cut out including the face image which has been detected by the face detection processing from the taken image to display the cut-out area on the display device; and
if the cut-out area overlaps with an edge of the taken image, reducing the cut-out area including the face area so that it does not overlap with the edge.

33. An image-taking apparatus comprising:
an image-taking device which takes an image of a subject;
a display device which displays the image taken by the image-taking device;
a face detection device which detects a face of a person who is the subject, from the taken image;
a face detection control button for inputting an instruction to set on/off of face detection processing performed by the face detection device; and
a display control device which controls the face detection device to execute the face detection processing for an image taken when the face detection processing is set to on, and causes the display device to display a face image including a face area detected from the taken image;
a face image switching device which, if multiple face areas are detected from the taken image, switches the face image displayed on a face display screen of the display device to a different face image in response to an instruction from the face detection control button, further comprising
a face area ranking device for executing a face area ranking processing, wherein the face area ranking device ranks the face areas in order of a size thereof, ranks the face areas with the same size in order of closeness to a center of the taken image, and ranks the face areas with the same size and the same distance from the center of the taken image in order of a face possibility score calculated by the face detection device, wherein
the face image switching device switches the displayed face image in order of a rank of the face area.

34. An image-taking apparatus comprising:
an image-taking device which takes an image of a subject;
a display device which displays the image taken by the image-taking device;
a face detection device which detects a face of a person who is the subject, from the taken image;
an image-taking mode setting device which sets an image-taking mode for taking an image by the image-taking device;
a face detection control button for inputting an instruction to set on/off of face detection processing performed by the face detection device; and
a display control device which controls the face detection device to execute the face detection processing for an image taken when such an image-taking mode that enables the face detection processing is set and the face detection processing is set to on, and causes the display device to display a face image including a face area detected from the taken image;
a face image switching device which, if multiple face areas are detected from the taken image, switches the face image displayed on a face display screen of the display device to a different face image in response to an instruction from the face detection control button, further comprising
a face area ranking device for executing a face area ranking processing, wherein the face area ranking device ranks the face areas in order of a size thereof, ranks the face areas with the same size in order of closeness to a center of the taken image, and ranks the face areas with the same size and the same distance from the center of the taken image in order of a face possibility score calculated by the face detection device, wherein
the face image switching device switches the displayed face image in order of a rank of the face area.

35. An image display control method comprising:
an image-taking step of taking an image of a subject;
a step of setting on/off of face detection processing, by a face detection control button for inputting an instruction to set on/off of the face detection processing; and
a display control step of executing, for an image taken when the face detection processing is set to on, the face detection processing for detecting a face area of the subject, and displaying a face image including the face area detected from the taken image on a display device;
a face image switching step of, if multiple face areas are detected from the taken image, switching the face image displayed on a face display screen of the display device to a different face image in response to an instruction from the face detection control button, further comprising the steps of:
ranking the face areas in order of a size thereof, ranking the face areas with the same size in order of closeness to a center of the taken image, and ranking the face areas with the same size and the same distance from the center of the taken image in order of a face possibility score calculated by the face detection device; and
switching the displayed face image in order of a rank of the face area.

36. An image display control method comprising:

an image-taking step of taking an image of a subject;

an image-taking mode setting step of setting an image-taking mode for taking the image;

a step of setting on/off of face detection processing by a face detection control button for inputting an instruction to set on/off of the face detection processing; and a display control step of executing, for an image taken when such an image-taking mode that enables the face detection processing is set and the face detection processing is set to on, the face detection processing for detecting a face area of the subject, and displaying a face image including the face area detected from the taken image on a display device;

a face image switching step of, if multiple face areas are detected from the taken image, switching the face image displayed on a face display screen of the display device to a different face image in response to an instruction from the face detection control button, further comprising the steps of:

ranking the face areas in order of a size thereof, ranking the face areas with the same size in order of closeness to a center of the taken image, and ranking the face areas with the same size and the same distance from the center of the taken image in order of a face possibility score calculated by the face detection device; and switching the displayed face image in order of a rank of the face area.

* * * * *